United States Patent
Sasaki et al.

(10) Patent No.: US 8,088,475 B2
(45) Date of Patent: Jan. 3, 2012

(54) ANTI-REFLECTING MEMBRANE, AND DISPLAY APPARATUS, OPTICAL STORAGE MEDIUM AND SOLAR ENERGY CONVERTING DEVICE HAVING THE SAME, AND PRODUCTION METHOD OF THE MEMBRANE

(75) Inventors: Hiroshi Sasaki, Mito (JP); Yasushi Tomioka, Hitachinaka (JP); Masaya Adachi, Hitachi (JP); Makiko Sugibayashi, Hitachi (JP); Ikuo Hiyama, Hitachinaka (JP); Katsumi Kondou, Mito (JP)

(73) Assignee: Hitachi, Ltd., Tokyo (JP)

( * ) Notice: Subject to any disclaimer, the term of this patent is extended or adjusted under 35 U.S.C. 154(b) by 1015 days.

(21) Appl. No.: 11/038,116

(22) Filed: Jan. 21, 2005

(65) Prior Publication Data
US 2005/0195486 A1 Sep. 8, 2005

(30) Foreign Application Priority Data

Mar. 3, 2004 (JP) .................................. 2004-058355
Nov. 18, 2004 (JP) .................................. 2004-333838

(51) Int. Cl.
*B32B 5/16* (2006.01)
*B32B 5/18* (2006.01)
*B32B 3/26* (2006.01)
*H01L 33/44* (2010.01)
*G02B 1/11* (2006.01)
*G02F 1/1335* (2006.01)

(52) U.S. Cl. ............... 428/304.4; 428/310.5; 428/312.6; 428/315.5; 428/317.9; 428/318.6; 428/331; 257/98; 313/110; 349/137; 359/580

(58) Field of Classification Search ............... 428/220; 359/580
See application file for complete search history.

(56) References Cited

U.S. PATENT DOCUMENTS

| | | | |
|---|---|---|---|
| 4,374,158 A | 2/1983 | Taniguchi et al. | |
| 4,816,333 A | 3/1989 | Lange et al. | |
| 5,612,128 A * | 3/1997 | Endo et al. | 428/323 |
| 5,871,843 A * | 2/1999 | Yoneda et al. | 428/337 |
| 6,191,833 B1 * | 2/2001 | Hirakata | 349/61 |
| 6,251,523 B1 * | 6/2001 | Takahashi et al. | 428/428 |
| 6,383,559 B1 | 5/2002 | Nakamura et al. | |
| 6,392,727 B1 * | 5/2002 | Larson et al. | 349/96 |
| 6,631,031 B2 * | 10/2003 | Lee et al. | 359/487 |
| 2002/0014090 A1 * | 2/2002 | Tsujino et al. | 65/17.2 |
| 2003/0128538 A1 * | 7/2003 | Shinohara et al. | 362/31 |
| 2003/0202137 A1 * | 10/2003 | Nakamura et al. | 349/96 |
| 2004/0253427 A1 | 12/2004 | Yokogawa et al. | |

FOREIGN PATENT DOCUMENTS

| | | |
|---|---|---|
| EP | 1 089 093 A | 4/2001 |
| EP | 1 445 095 A1 | 8/2004 |
| JP | A-7-92305 | 4/1995 |
| JP | A-11-6902 | 1/1999 |

(Continued)

*Primary Examiner* — Marie R. Yamnitzky
(74) *Attorney, Agent, or Firm* — Dickstein Shapiro LLP

(57) ABSTRACT

A conventional thin membrane of aerogel, although achieving a low refractive index, retains some difficulty when it is to be applied to display apparatuses or the like, because of its low strength. Membranes produced by other methods are difficult to simultaneously achieve low refractive index and sufficient strength. The present invention provides an anti-reflecting membrane which is formed at least on one side of a plate transmitting visible light, is composed of fine inorganic oxide particles and a binder, contains a number of pores inside, and has an arithmetic average surface roughness (Ra) below 6 nm. The present invention also provides preferred embodiments of the display apparatuses provided with the membrane.

30 Claims, 9 Drawing Sheets

FOREIGN PATENT DOCUMENTS

| | | |
|---|---|---|
| JP | 11-352304 A | 12/1999 |
| JP | 2000-9906 A | 1/2000 |
| JP | A-2000-75105 | 3/2000 |
| JP | 2001188104 | 7/2001 |
| JP | A-2003-201443 | 7/2003 |
| JP | 2003-337202 A | 11/2003 |
| JP | 2004-83307 | 3/2004 |
| JP | A-2004-123996 | 4/2004 |
| JP | 2005249982 | 9/2005 |
| WO | WO 01/42156 A1 | 6/2001 |

\* cited by examiner

POROUS PORTION

NON - POROUS PORTION

ANTI-REFLECTING MEMBRANE, AND DISPLAY APPARATUS, OPTICAL STORAGE MEDIUM AND SOLAR ENERGY CONVERTING DEVICE HAVING THE SAME, AND PRODUCTION METHOD OF THE MEMBRANE

FIELD OF THE INVENTION

The present invention relates to an anti-reflecting membrane formed on a plate, various products using the same, optical member provided with the anti-reflecting membrane, and various display apparatuses, e.g., personal computers, TV sets, cellular phones and PDAs, provided with the anti-reflecting membrane on the outermost surface.

BACKGROUND OF THE INVENTION

When a display apparatus works in a condition of high light intensity, e.g., under bright illumination or in the open air, outside light is reflected by the surface to cause reflection of ambient objects in the display screen. This tends to make the image hard to watch, in particular a dark portion of low light intensity. Various attempts have been made to solve these problems, e.g., coating the display screen with an anti-reflecting membrane to reduce light reflection by interference, or roughening the screen's outermost surface to reduce regular reflection intensity by scattering.

However, roughened surface causes light scattering, which makes the image slightly vague. A display screen not surface-roughened tends to show a clearer image for a personal computer which frequently displays letters and TV set which frequently shows pictures. Plates on monitor surfaces are generally made of transparent materials, e.g., glass (refractive index: 1.5 to 1.54), acrylic resin (refractive index: 1.49) and polyethylene terephthalate resin (refractive index: 1.56). Reflectance R of these members is given by the following Equation (1):

$$R=\{(n_1-n_0)/(n_1+n_0)\}^2 \quad (1)$$

wherein,
$n_0$: refractive index of air
$n_1$: refractive index of the member
Equation (1) can be reduced to Equation (2), knowing that refractive index of air $n_0$ is generally 1.0.

$$R=\{(n_1-1)/(n_1+1)\}^2 \quad (2)$$

The transparent member of glass, acrylic resin or PET resin has a reflectance of 3.9 to 4.0, 3.9 or 4.8%, found by substituting $n_1$ in Equation (2) by a refractive index of each material. The member coated with a single-layer anti-reflecting membrane of adequate thickness to reduce the reflectance has a reflectance R' given by Equation (3):

$$R'=\{(n_2^2-n_0\times n_1)/(n_2^2+n_0\times n_1)\}^2 \quad (3)$$

wherein,
$n_0$: refractive index of air
$n_1$: refractive index of an outermost surface plate
$n_2$: refractive index of a membrane
Equation (3) can be reduced to Equation (4), knowing that refractive index of air $n_0$ is generally 1.0.

$$R'=\{(n_2^2-n_1)/(n_2^2+n_1)\}^2 \quad (4)$$

Reflectance R' should be theoretically zero, when $n_2^2$=n1 (or $n_2=\sqrt{n_1}$).

This means that a suitable refractive index of an anti-reflecting membrane on glass is around 1.22. It is however very difficult to secure a sufficiently low refractive index by a single-layer membrane, because even a fluorinated resin and magnesium fluoride have a respective refractive index of around 1.34 and 1.38, the former being known as a material of relatively low refractive index and the latter as an inorganic material of particularly low refractive index.

Recently, methods for decreasing refractive index of a single-layer membrane have been proposed. For example, Patent Document 1 proposes a thin membrane of aerogel. It is composed of fine particles having pores inside (fine hollow particles) and a binder for supporting the fine hollow particles. The inside pore has a refractive index substantially the same as that of air (refractive index: 1.0), with the result that the membrane as a whole has a refractive index close to that of air even when the fine hollow particles or binder has a high refractive index. In other words, the member can have a reduced refractive index by forming this membrane on a plate.

Patent Document 2 proposes another method for decreasing refractive index of a single-layer membrane without using aerogel. It is composed of superfine organic particles having surfaces exposed in the area near air and roughened, to decrease surface density and thereby to decrease membrane refractive index.

Patent Document 3 proposes still another method for providing a low-refractive-index membrane having pores of honeycomb structure. These pores are designed to pass through the fine silica particles and run in parallel to each other, in order to maximize void fraction without damaging strength of the fine silica particles. It claims that a low-refractive-index membrane of high strength can be produced.
Patent Document 1: JP-A 2003-201443
Patent Document 2: JP-A 7-92305
Patent Document 1: JP-A 2004-83307.

BRIEF SUMMARY OF THE INVENTION

The thin aerogel membrane proposed by Patent Document 1 involves problems resulting from low mechanical strength due to its high void fraction. Physical strength of the membrane greatly depends on that of the fine hollow particles. Decreasing refractive index of the fine hollow particles needs increasing their void fraction, and it is difficult to increase physical strength of the thin aerogel membrane comprising the fine hollow particles of decreased shell thickness.

Increasing void fraction of these particles while increasing their thickness is not practical, because this is accompanied by increased particle size, and the particles of increased size tend to scatter visible light and decrease their transmittance. Moreover, the method uses carbon dioxide of supercritical state, which causes special production-related problems.

The low-refractive-index membranes proposed by Patent Documents 2 and 3, the latter having pores of honeycomb structure, are considered to have a high mechanical strength, because they are produced by crosslinking or polymerization. However, they have irregularities on the surface, which may catch dust to increase refractive index. Moreover, they have a refractive index of around 1.3 to 1.4, which is higher than the ideal level of 1.2.

The present invention has been developed to solve these problems. The objects of the present invention are to provide a membrane which simultaneously satisfies high anti-reflecting capacity and physical strength, and optical members and display apparatuses provided with the membrane.

The inventors of the present invention have developed, after having extensively studied various membrane materials and membrane-forming methods, a method for providing a pore of 5 to 200 nm within a binder particle or between a binder particle and fine inorganic oxide particle. The membrane of this material is found to show a lower refractive index than the binder and, at the same time, high physical strength in spite of pores present in the membrane, because the fine inorganic oxide particles which it comprises are solid.

The pores are not evenly distributed within the membrane, but more heavily distributed in the vicinity of the anti-reflecting membrane surface than on the plate surface. This structure is found to exhibit its inherent anti-reflecting capacity, and over a wide wavelength range, even when its thickness changes to some extent.

It is also found that, when fine silicon oxide particles are used as the inorganic particles and silicon compound having a hydrolysable residue (silica sol) as the binder, the membrane shows a fairly lower refractive index (1.33 or less) than silicon oxide as the binder and, at the same time, high physical strength in spite of pores present in the membrane.

Moreover, the membrane is found to bring an effect of preventing deposition of dust or the like thereon even in a low-moisture condition in winter, because of its very low surface resistance.

The present invention provides the following aspects to achieve the above objects.

(1) The first aspect is an anti-reflecting membrane composed of fine inorganic oxide particles and a binder, and having a thickness of 60 to 190 nm and pores of 5 to 200 nm in size inside.
(2) The second aspect is the anti-reflecting membrane of the first aspect, wherein the fine inorganic oxide particles are of silicon oxide.
(3) The third aspect is the anti-reflecting membrane of the first aspect, wherein the fine inorganic oxide particles are of silicon oxide and the binder is of a silicon compound having a hydrolysable residue.
(4) The fourth aspect is the anti-reflecting membrane of the first aspect which has a surface resistance of $10^{11}\Omega$ or less.
(5) The fifth aspect is the anti-reflecting membrane of the first aspect which has a surface layer composed of a fluorine compound, the layer having a contact angle of 100 to 180°, inclusive, with water.
(6) The sixth aspect is the anti-reflecting membrane of the fifth aspect, wherein the fluorine compound has the following structure.

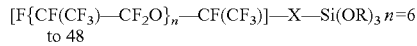

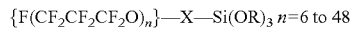

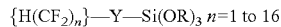

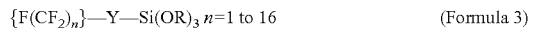

(Formula 3)

wherein, X is a site at which a perfluoropolyether chain and alkoxy silane residue are bound to each other, Y is a site at which a perfluoroalkyl chain and alkoxy silane residue are bound to each other, and R is an alkyl group.
(7) The seventh aspect is the anti-reflecting membrane of the second aspect, wherein the silicon oxide has a chain-shaped structure.
(8) The eighth aspect is the anti-reflecting membrane of the first aspect, wherein the fine inorganic oxide particles are of silicon oxide, have a chain-shaped structure and account for 75% by weight or more on the solids in the membrane.
(9) The ninth aspect is a display apparatus having an anti-reflecting membrane on the outermost surface of the display section, wherein the anti-reflecting membrane is the one according to the first aspect.

(10) The tenth aspect is an optical storage medium working based on differential reflectance of light at the recording section, wherein the anti-reflecting membrane according to the first aspect is provided on the outermost surface.
(11) The $11^{th}$ aspect is a greenhouse having at least one transparent wall, wherein the wall is provided with the anti-reflecting membrane according to the first aspect.
(12) The $12^{th}$ aspect is a mobile display device having an inputting section and display screen, wherein the display screen comprises a transparent plate coated with an anti-reflecting membrane, the anti-reflecting membrane being the one according to the first aspect.
(13) The $13^{th}$ aspect is a solar energy converting device comprising an insulating transparent plate, surface electrode, photon-electron converter, middle transparent electrode and bottom electrode, wherein the insulating transparent plate is coated with the anti-reflecting membrane according to the first aspect.
(14) The $14^{th}$ aspect is a transparent plate for building interior materials, wherein the plate is provided with the anti-reflecting membrane according to the first aspect.
(15) The $15^{th}$ aspect is a method for forming an anti-reflecting membrane, comprising a step for spreading a coating material composed of fine inorganic oxide particles, a binder and solvent, and a step for heating the coating material.
(16) The $16^{th}$ aspect is the method according to the $15^{th}$ aspect, wherein the heating step is carried out at a boiling point of the coating material or higher but at the boiling point plus 150° C. or lower.
(17) The $17^{th}$ aspect is the method according to the $15^{th}$ aspect, wherein the fine inorganic oxide particles are of silicon oxide.
(18) The $18^{th}$ aspect is the method according to the $15^{th}$ aspect, wherein the binder is of a silicon compound having a hydrolysable residue.
(19) The $19^{th}$ aspect is the method according to the $15^{th}$ aspect, wherein the step for heating the coating material is followed by spreading a solution dissolving a fluorine compound and heating the solution.
(20) The $20^{th}$ aspect is the method according to the $15^{th}$ aspect, wherein the fluorine compound is represented by the following formula:

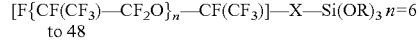

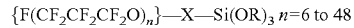

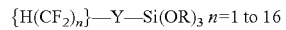

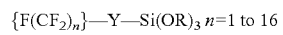  (Formula 4)

wherein, X is a site at which a perfluoropolyether chain and alkoxy silane residue are bound to each other, Y is a site at which a perfluoroalkyl chain and alkoxy silane residue are bound to each other, and R is an alkyl group.
(21) The $21^{st}$ aspect is the method according to the $15^{th}$ aspect, wherein the fine inorganic oxide particles are of silicon oxide having a chain-shaped structure.

Another aspect of the present invention is an anti-reflecting membrane formed on at least one side of a plate which transmits visible light, composed of fine particles of inorganic oxide and a binder, and having pores inside, wherein arithmetic average surface roughness (Ra) is below 6 nm on one side.

Still another aspect of the present invention is an anti-reflecting membrane formed on at least one side of a plate which transmits visible light, composed of fine particles of inorganic oxide and a binder, and having pores inside, wherein the binder is mainly composed of the same material as that for the plate.

Still another aspect of the present invention is an anti-reflecting membrane formed on at least one side of a plate which transmits visible light, composed of fine particles of inorganic oxide and a binder, and having pores inside, wherein the pores are distributed more densely inside than on the surface in contact with air.

Still another aspect of the present invention is the above-described anti-reflecting membrane, wherein the pores have a major axis of 5 to 200 nm, inclusive. Still another aspect of the present invention is the above-described anti-reflecting membrane, wherein the membrane has a lower refractive index than the plate. Still another aspect of the present invention is the above-described anti-reflecting membrane, wherein the fine particles have a major axis of 190 nm or less and minor axis shorter than thickness of the membrane. Still another aspect of the present invention is the above-described anti-reflecting membrane, wherein the plate is made of glass, and the binder is mainly composed of a compound having silicon and oxygen bound to each other.

Still another aspect of the present invention is an optical member having the above-described anti-reflecting membrane.

Still another aspect of the present invention is a liquid-crystal display panel comprising a pair of plates, liquid-crystal layer placed between the pair of plates, electrodes for applying charges on the liquid-crystal layer, polarizing plate provided at least one of the pair of plates, and the above-described anti-reflecting membrane. Still another aspect of the present invention is a display panel comprising a pair of plates, fluorescent member placed between the pair of plates, electrodes on at least one side of the plate in contact with the fluorescent member, and the above-described anti-reflecting membrane. Still another aspect of the present invention is the above-described liquid-crystal display panel, wherein a transparent plate is formed on the polarizing plate via an air layer, and the above-described anti-reflecting membrane is formed on at least one side of the polarizing plate or transparent plate. Still another aspect of the present invention is the above-described liquid-crystal display panel, wherein a transparent plate is formed on the polarizing plate via an organic layer, and the above-described anti-reflecting membrane is formed on at least one side of the polarizing plate or transparent plate.

Still another aspect of the present invention is the above-described display apparatus, wherein the display panel surface member, transparent plate and organic layer satisfy the following inequalities:

$$|n_1 - n_0| \leq 0.2 \text{ and } |n_2 - n_0| \leq 0.2$$

wherein, $n_0$: refractive index of the display panel surface member
$n_1$: refractive index of the transparent plate
$n_2$: refractive index of the organic layer Still another aspect of the present invention is a display apparatus comprising a light source and the above-described liquid-crystal display panel for controlling light emitted from the light source to display an image. Still another aspect of the present invention is the above-described display apparatus, wherein the light source is partly or totally composed of an LED, and the transparent plate is made of an organic resin. Still another aspect of the present invention is the above-described display apparatus, wherein the light source is coated with the above-described anti-reflecting membrane. Still another aspect of the present invention is the above-described display apparatus, wherein at least one member having an interface with air is provided between the light source and liquid-crystal display panel, the member being coated with the above-described anti-reflecting membrane at least on one side. Still another aspect of the present invention is the above-described display apparatus, wherein the member is selected from the group consisting of a diffusion plate, diffusion sheet, film having a prism structure on the surface, optical waveguide, polarizing plate reflecting certain polarized light and polarizing plate absorbing certain polarized light.

Other objects, features and advantages of the invention will become apparent from the following description of the embodiments of the invention taken in conjunction with the accompanying drawings.

Figure 1:
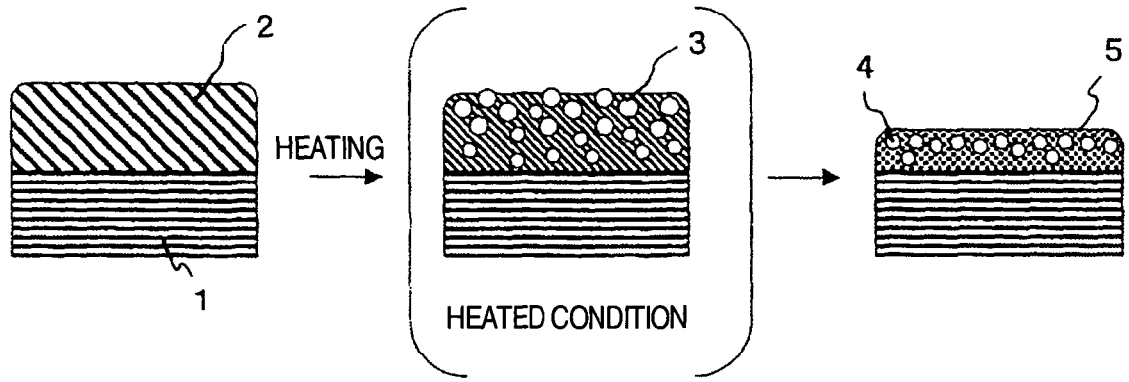
FIG. 1 outlines one example of the method for forming the anti-reflecting membrane of the present invention.

| Description of Reference Numerals | |
|---|---|
| 1 | Plate |
| 2 | Coating solution |
| 3 | Bubbles |
| 4 | Pores |
| 5, 9 | Anti-reflecting membrane of the present invention |
| 6 | Green house provided with the anti-reflecting membrane(s) of the present invention |
| 7 | Plant pot |
| 8 | Tomato seedling |
| 10 | Polycarbonate plate |
| 11 | Protective layer |
| 12 | Recording layer |
| 13 | Monitor |
| 14 | Spacer |

-continued

| | Description of Reference Numerals |
|---|---|
| 15 | Acrylic resin plate coated with anti-reflecting membranes on both sides |
| 16, 20 | Polarizing plate |
| 17 | Display screen |
| 18 | Acryl resin plate |
| 19 | Glass plate coated with an anti-reflecting membrane |
| 21 | Operating section |
| 22 | Glass plate coated with an anti-reflecting membrane |
| 23 | Surface electrode |
| 24 | Upper photon-electron converter |
| 25 | Middle transparent electrode |
| 26 | Lower photon-electron converter |
| 27 | Bottom electrode |
| 115 | Pores |
| 116, 145, 147, 155, 156, 163, 165, 166 | Anti-reflecting membrane |
| 141 | Fluorescent member |
| 142 | Back-side glass plate |
| 143 | Front-side glass plate |
| 144 | Front filter |
| 151, 161 | Panel |
| 145, 152 | Fluorine-based anti-reflecting membrane |
| 153, 162, 174 | Polarizing plate |
| 154 | Front-side plate |
| 164 | Acryl resin plate |
| 167 | Organic layer |
| 171 | Glass plate |
| 172 | Color filter |
| 173 | Liquid-crystal layer |
| 175 | Diffusion sheet |
| 176 | Prism sheet |
| 177 | Diffusion plate |
| 178 | Cold-cathode fluorescent lamp tube. |

DETAILED DESCRIPTION OF THE INVENTION

The embodiments and Examples of the present invention are described by referring to the attached drawings, which by no means limit the present invention, and variations may be made without departing from the sprit and scope of the present invention.

The anti-reflecting membrane of the present invention is composed of at least fine inorganic oxide particles and a binder, where the binder works to bind the membrane. The membrane is produced basically by spreading a mixture comprising fine inorganic oxide particles, a binder and solvent on a plate and then heating it into a film. When the binder is of a thermosetting material, e.g., silica sol, or monomer for epoxy or melamine resin, it is incorporated with a small quantity of catalyst to accelerate thermosetting of the membrane. The anti-reflecting membrane may be formed by a process for forming a single-layer or multi-layer membrane.

The method for forming the anti-reflecting membrane is outlined by referring to FIG. 1. First, the plate 1 is coated with the coating solution 2 to form a coating film. Then, it is heated. This evaporates the solvent to leave the bubbles 3 in the film. These bubbles are held as the pores 3 in the film, after it is cooled, to form the anti-reflecting membrane 5 of the present invention.

Figure 2:
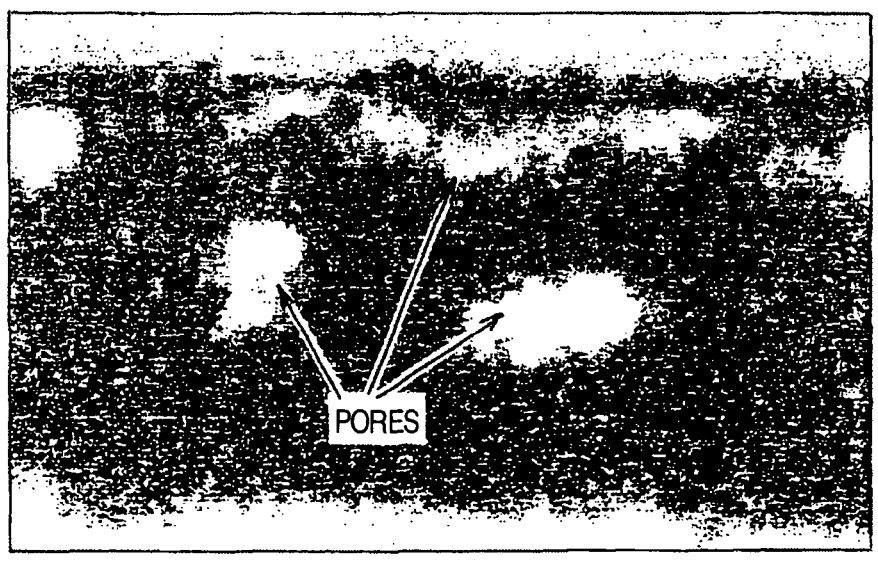
FIG. 2 is a photograph showing a cross-section of the anti-reflecting membrane of the present invention formed on an acryl resin plate.

FIG. 2 is a photograph showing a cross-section of one example of the anti-reflecting membrane of the present invention. It is formed on an acrylic plate. Fine silicon oxide particles are used as the inorganic oxide particles, and silica sol as the binder. The acrylic plate is coated with the membrane of low refractive index and carbon, in this order. The carbon layer is formed only to keep the cross-section intact while the sample is prepared, and has no influence on the effect of the anti-reflecting membrane of the present invention.

FIG. 2 confirms presence of several pores in the anti-reflecting membrane of low refractive index. They have a major axis of around 5 to 150 nm, although indefinite in shape, where the major axis means length of the longest straight line drawn from side to side.

In order to confirm presence of the pores in the membrane, intensity of the elements present in the portion considered to be a pore and solid portion were measured. The results are given in FIG. 3.

Figure 3:
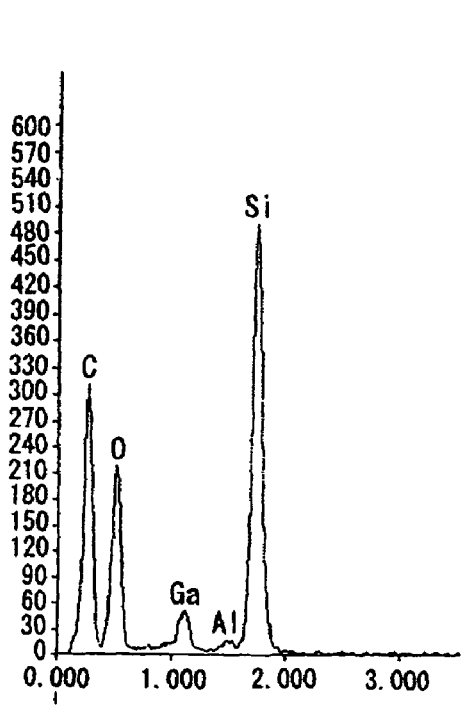
FIG. 3 (A): Intensity of the elements present in a region of pores of the anti-reflecting membrane of the present invention; (B): Intensity of the elements present in the region other than a region of pores of the anti-reflecting membrane of the present invention.
Figure 3:
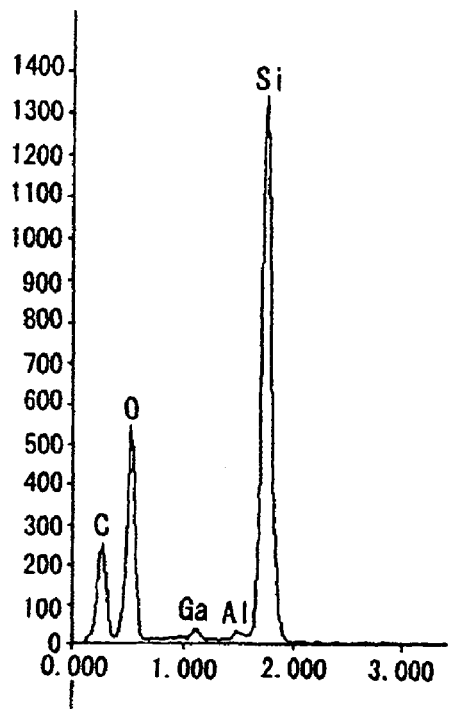

As shown in FIG. 3, the elements, e.g., carbon, oxygen and silicon, have a lower intensity in the portion considered to be a pore than in the solid portion, which confirms presence of the pore.

Refractive index of the membrane can be controlled by changing ratio of silicon oxide (refractive index: around 1.5) as the binder to the pores (refractive index: around 1.0).

Formation of the pores can be also controlled by selecting a solvent of adequate boiling point and thermosetting treatment temperature, knowing that evaporation of the solvent in the membrane during the thermosetting step contributes to formation of the pores.

The pores are formed more densely in the vicinity of the outermost surface of the membrane, a tendency which can be seen in FIG. 2. This conceivably results from the pores, which start to appear within the coating solution on the plate as it is heated for thermosetting, rising up to the surface area.

Lamination of two or more membranes is one select to massively form the pores also inside as well as in the surface area. This also contributes to increased membrane strength.

Figure 9:
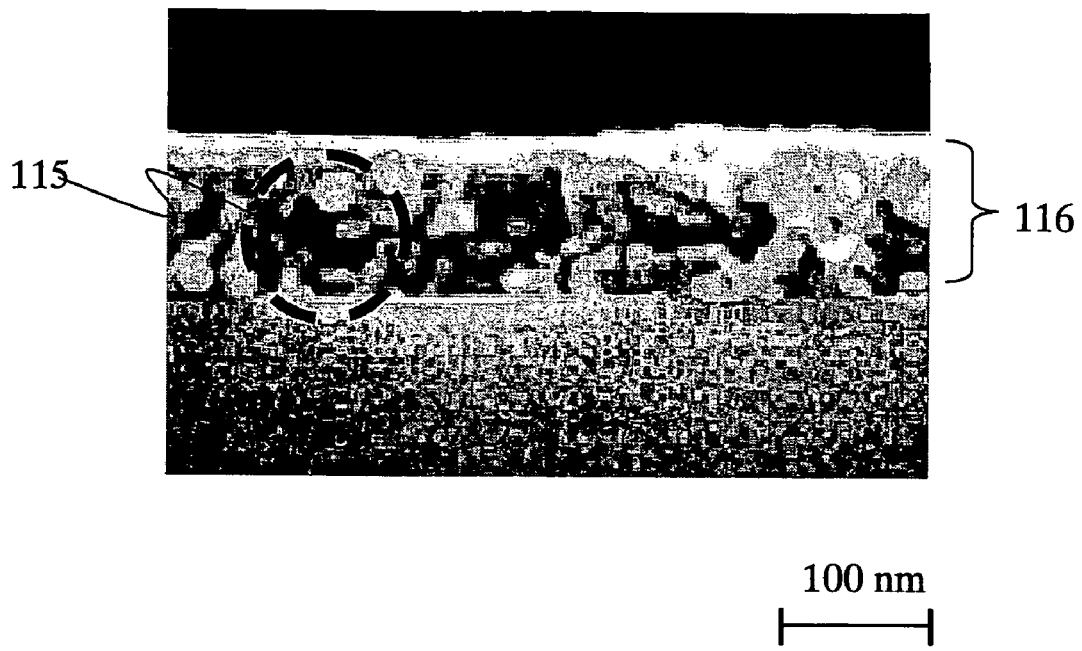
FIG. 9 is a photograph showing a cross-section of the anti-reflecting membrane of the present invention.

FIG. 9 presents a cross-sectional view (photograph) of this membrane. The photograph shows the pores 115 distributed inside of the anti-reflecting membrane 116 but to a lesser extent on the surface. The surface on-which the pores are distributed massively becomes rougher with larger irregularities, which tend to be wiped out when the surface is cleaned with cloth or the like. These problems are reduced when the surface has smaller irregularities, to result in improved physical strength of the membrane.

Next, the coating solution and film-making process are described in detail.

Coating Solution

The coating solution is composed of a binder, fine inorganic oxide particles and solvent. Each of these constituent is described below.

(1-1) Binder

A binder for coating solutions may be selected from highly transparent, organic or inorganic high-molecular-weight materials, and materials polymerizable to have a high molecular weight. Organic high-molecular-weight materials include thermoplastic ones. More specifically, they include acryl resin, polystyrene, styrene/acryl copolymer, polyester resin, polyvinyl chloride, ethylene/vinyl acetate copolymer, polyethylene terephthalate resin, polyvinylidene chloride and polycarbonate resin. Organic materials polymerizable to have a high molecular weight include thermosetting ones. More specifically, they include a polyamic acid derivative having an aliphatic structure.

Inorganic high-molecular-weight materials include a silicon compound having a hydrolysable residue (commonly referred to as silica sol) and titanium compound having a hydrolysable residue (commonly referred to as titania sol). These are compounds of alkoxy silane or alkoxy titanium polymerized to have a molecular weight of several thousands, and are soluble in alcohol-based solvents. When heated, they can be formed into a binder of silicon oxide or titanium oxide.

Inorganic materials polymerizable to have a high molecular weight include alkoxy silane having a varying substituent, e.g., amino, chloro or mercapto group. They are specifically cited later, when silicon compounds having a hydrolysable residue are described.

Silica sol can be cited as one of silicon compounds having a hydrolysable residue. It is transformed into silicon oxide, when heated. One of the typical methods for forming silica sol is described. A tetraalkoxy silane is polymerized to have a molecular weight of several thousands on the average, when heated in a weakly acidic condition, because alkoxy group is hydrolyzed into hydroxyl group, which reacts with neighboring alkoxy group to form the silicon-oxygen-silicon bond. Tetraalkoxy silanes for producing silica sol include tetramethoxy silane, tetraethoxy silane, tetrapropoxy silane, tetraisopropxy silane, tetrabutoxy silane and tetraisobutoxy silane. Silicon compounds having chlorine group instead of alkoxy silane group, e.g., silicon tetrachloride, are also suitable.

Silicon compounds having a hydrolysable residue other than tetraalkoxy silanes include those having amino, chloro or mercapto group. More specifically, they include 3-aminopropyltrimethoxy silane, 3-aminopropyltriethoxy silane, N-(2-aminoethyl)-3-aminopropyltrimethoxy silane, 3-chloropropyltrimethoxy silane, 3-chloropropylmethyldimethoxy silane, 3-mercaptopropyltrimethoxy silane, vinyl trimethoxy silane, vinyl triethoxy silane, 3-glycidoxypropyltrimethoxy silane, 3-glycidoxypropylmethyldimethoxy silane and 3-methacryloxypropyltrimethoxy silane.

(1-2) Fine Inorganic Oxide Particles

The fine inorganic oxide particles for the present invention are colorless or white fine particles of silicon, aluminum, titanium and cerium oxides. When they are spherical, they preferably have an average particle size of 190 nm or less to prevent scattering of visible light entering the membrane. For behavior of particles in visible light, see "Industrial Science of Color," Yoshinobu Naya, $2^{nd}$ edition, published by Asakura Shoten, Feb. 10, 1984 page 2. The larger particles may not be suitable for displays, because of possible scattering of incident light to make the membrane cloudy. When they are linear in shape, they have preferably a thickness (thickness of the cross-section perpendicular to the longitudinal direction) of 190 nm for the same reason as the above. The lower limit size of the primary particles is not limited, so long as they are well dispersed in the membrane.

Two or more types of fine inorganic oxide particles of different size of shape may be used.

It should be noted that the silicon compound having a hydrolysable residue for the binder may agglomerate the primary particles into the larger secondary particles, when insufficiently soluble in the solvent, to also cause the problems of making the membrane cloudy. It is therefore preferable to use a solvent capable of well dispersing the fine silicon oxide particles. Such a solvent, however, cannot be used depending on a plate to be used. In such a case, a dispersant is used to well disperse them.

Colloidal silica is suitable for the fine silicon oxide particles. The colloidal silica products include organosilica sol, e.g., Snowtex (Nissan Chemical Industries). These fine particles have hydroxyl group massively on the surface, and are highly hydrophilic. Moreover, an anti-reflecting membrane containing these particles is hydrophilic and, at the same time, has a very low electrical resistance of around $1 \times 10^{10}$ to $10 \times 10^{10} \Omega$. This level is much lower than that of glass, or acryl, polycarbonate or PET resin, of the order of $\frac{1}{10,000}$ to $\frac{1}{1,000,000}$. Therefore, the membrane efficiently prevents deposition of dust or the like thereon, making itself applicable to widely varying devices. For example, a greenhouse or the like provided with the anti-reflecting membrane of the present invention on a transparent surface is blessed with more incident light, leading to shortened plant growth time. An image-forming device can display clean images for extended periods, even when placed in a low-moisture room. A transparent plate coated with the anti-reflecting membrane of the present invention is suitable for building interior materials, e.g., clean room walls and partitions.

Moreover, the anti-reflecting membrane of the present invention can have liquid repellency, when treated with a perfluoropolyether compound having alkoxy silane group or water repelling agent of perfluoroalkyl compound, described later.

In addition to silicon oxide, aluminum oxide is also a useful material for its low refractive index. For example, alumina sol having hydroxyl group massively on the surface is suitably used to form a membrane of low resistivity.

(1-3) Solvent

An effective solvent for the coating solution dissolves or evenly disperse the binder therein. An alcohol-based solvent is suitable for the coating solution comprising a silicon compound having a hydrolysable residue as the suitable binder and fine silicon oxide particles suitable as the fine inorganic oxide particles. More specifically, the alcohol-based solvents useful for the present invention include ethanol, n-propanol, iso-propanol, n-butanol, iso-butanol, tert-butanol, n-pentanol, iso-pentanol and tert-pentanol. An alcohol-based solvent is suitable, because it does not easily swell, deform or dissolve a resin plate of, e.g., polycarbonate or acryl. It tends to have a higher boiling point as its carbon number increases, and a lower boiling point as it is more branched.

(2) Film-Making Method

The low-refractive-index membrane of the present invention is formed by pre-treating a plate, spreading a coating solution to form a film thereon and heating the film. It may be formed by a process for forming a single-layer or multi-layer membrane. Moreover, the heating step may be followed by post-treatment to improve wear-resistance of the membrane. These steps are described below in detail.

(2-1) Pre-Treatment

The pre-treatment step cleans a plate to improve its wettability. This is to evenly deposit a coating solution on the plate.

(i) Plate Cleaning

In the plate cleaning step, a solvent, detergent or the like which well dissolves dirt on the plate or removes it from the plate is used. When the plate is made of a resin, e.g., acryl or polycarbonate resin, an alcohol-based solvent, e.g., methanol, ethanol, propanol or butanol, is more preferable than a solvent, e.g., tetrahydrofuran or dioxane, which dissolves the surface to make it cloudy. When the plate is made of glass, immersing the plate in a basic solution (e.g., aqueous sodium hydroxide solution) to slightly etch the surface can remove dirt along the way.

(ii) Improvement of Plate Wettability

Improving plate wettability allows a coating solution to be more evenly spread on the surface, reducing film thickness fluctuations and improving optical properties of the membrane on the plate. It also enhances adhesion of the membrane to the plate, leading to improved membrane strength. Plate wettability can be improved by surface modification with the aid of an adequate device, e.g., plasma irradiator, or chemical modification with an acidic or basic solution or the like.

Surface Modification with the Aid of a Device

The methods falling into this category include oxygen plasma irradiation, exposing to an ozone atmosphere and UV irradiation. Each method depends on active oxygen acting on the plate surface to form hydroxyl or carboxyl group or the like. These groups are hydrophilic, and the surface on which they are formed will have improved wettability. UV irradiation excites oxygen in air into an active state with UV for surface modification. Therefore, it brings an effect similar to that by oxygen plasma irradiation or exposing to an ozone atmosphere. Argon plasma irradiation can be also used for the surface modification.

Chemical Modification

Glass has improved wettability when immersed in an aqueous sodium hydroxide solution, because the silicon-oxygen bond on the surface is broken to form hydroxide group.

(2-2) Coating Method

The methods for coating the plate include, but not limited to, spin coating, dip coating, bar coating, coating by an applicator, spray coating and flow coating. In order to control the membrane at an adequate thickness, it is necessary to select a correct coating solution concentration and conditions for an individual coating method. The conditions which affect membrane thickness are rotating speed and time for spin coating, dipping time and withdrawing speed for dip coating, depth of the groove on the surface of the bar for bar coating, gap size for coating by an applicator, spray moving speed for spray coating, and angle at which the plate is kept and quantity of coating solution used for flow coating.

It is preferable to set a target membrane thickness at 60 to 190 nm. Theoretically, reflectance attains a minimum at a membrane thickness t tantamount to $\lambda/4\,n$, wherein $\lambda$ is wavelength of incident light and n is refractive index of a medium through which incident light enters (transparent plate, or anti-reflecting membrane of the present invention).

Figure 10:
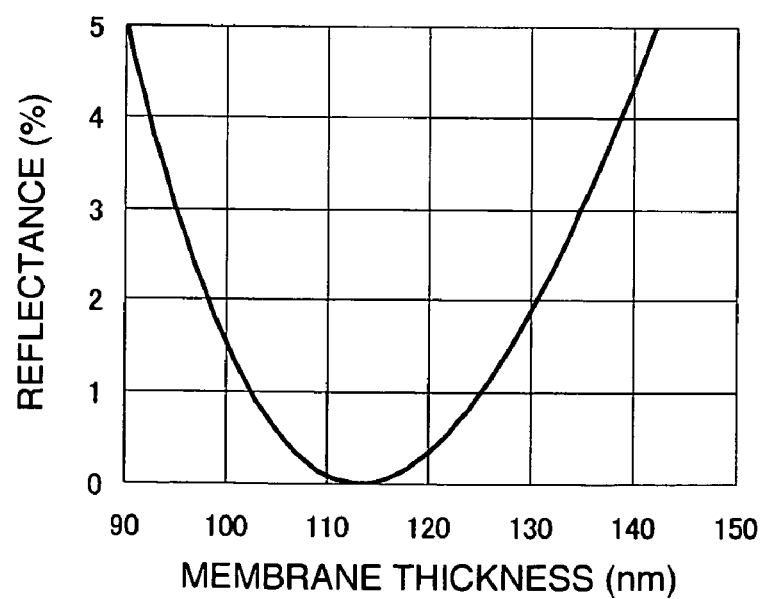
FIG. 10 shows the relationship between reflectance and thickness of the anti-reflecting membrane of the present invention.

When incident light is visible light (wavelength: 380 to 760 nm) and a material having a refractive index in a range from that of air (refractive index: around 1.0) as a medium to that of transparent glass plate of relatively high refractive index (around 1.7) is used, the desirable minimum membrane thickness is $380/(4 \times 1.7) = 56$ nm. A membrane thickness below 56 nm may not sufficiently affect reflectance when incident light has a wavelength in the visible range. It is preferable to set the target minimum thickness at 60 nm, which is slightly larger than 56 nm, in consideration of membrane thickness distribution occurring in the actual production process. On the other hand, the desirable maximum membrane thickness is $760/(4 \times 1.0) = 190$ nm. Based on the above considerations, thickness of the membrane of the present invention is preferably in a range from 60 to 190 nm. Luminosity factor varies between individuals. A wavelength ($\lambda$ at which relative spectral responsivity attains a maximum in the photopic relative luminosity curve ("Industrial Science of Color," Yoshinobu Naya, $2^{nd}$ edition, published by Asakura Shoten, Feb. 10, 1984, pages 4 to 8) is around 555 nm. In other words, a wavelength at which men's luminosity factor attains a maximum is around 555 nm in a bright atmosphere. Refractive index of an anti-reflecting membrane theoretically decreasing reflectance to 0% depends on refractive index of a plate on which the membrane is formed, because it is the square root of that of the plate. Materials for plates applied to display apparatuses, e.g., monitor, include glass, and acryl and PET resins. The anti-reflecting membrane preferably has a refractive index of 1.22 to 1.24, 1.22 and 1.25, when formed on a glass plate (refractive index: 1.50 to 1.54), acryl resin plate (1.49) and PET resin plate (1.56), respectively. Based on the above considerations, an anti-reflecting membrane can theoretically decrease reflection of light to 0%, when it is formed on a plate having a refractive index of 1.5 and light has a wavelength of 555 nm. An uncoated plate has a reflectance of around 4% on one side, and an anti-reflecting membrane thickness which can decrease reflectance to 4% or lesson is in a range from 90 to 140 nm. FIG. 10 illustrates the relationship between reflectance and membrane thickness under the above conditions.

(2-3) Heating

The coated plate is heated to remove the solvent by evaporation, or to accelerate the polymerization. When a thermosetting resin is used as the binder, the heating should be carried out at a thermosetting temperature of the resin or higher. It is therefore necessary to select the solvent, plate and plate materials to satisfy these requirements. The plate is preferably made of a material similar to that for the membrane.

(2-4) Outline of Post Treatment

The anti-reflecting membrane is produced, when it is thermally set. Its surface will have improved fouling resistance, when coated with a fluorine compound having liquid repellency. However, the layer of a fluorine compound having liquid repellency should be sufficiently thin not to deteriorate the anti-reflecting capacity of the membrane. Thickness of the liquid-repellent layer is 6 nm or less to control the adverse effect on membrane reflectance at below 1% at a light wavelength of 555 nm at which men's luminosity factor is kept at a high level.

The coating layer of a fluorine compound having liquid repellency may be formed by one of the following two methods.

Coating with a Layer of Fluorine Compound Having Liquid Repellency

This method coats the anti-reflecting membrane with a layer of fluorine compound having liquid repellency. The coated membrane exhibits liquid repellency. It should be noted that coating of the membrane of low resistance with a liquid-repellent fluorine compound has increased surface resistance, possibly accelerating deposition of dust or the like thereon.

The materials useful for forming the liquid-repellent layer include CYTOP (Asahi Glass) and INT304VC (INT Screen). Each of these materials is diluted with a solvent, spread on a plate and heated to remove the solvent by evaporation, in order to form the liquid-repellent layer. It may be thermally set during the heating step depending on circumstances.

Binding a Perfluoropolyether or Perfluoroalkyl Compound to the Membrane

This method binds a perfluoropolyether or perfluoroalkyl compound having an alkoxy silane group or the like, at the terminal, which can be bound to the anti-reflecting membrane. More specifically, the compounds represented by Formula 5 can be bound to the anti-reflecting membrane.

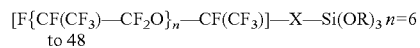

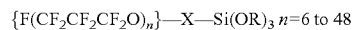

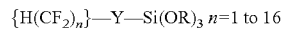

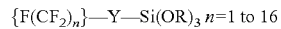 (Formula 5)

wherein, X is a site at which a perfluoropolyether chain and alkoxy silane residue are bound to each other, Y is a site at which a perfluoroalkyl chain and alkoxy silane residue are bound to each other, and R is an alkyl group.

The compound does not totally cover the anti-reflecting membrane surface, but are distributed in places like grass growing on the ground. Therefore, the membrane of low resistance ($10^{11}\Omega$ or less) can keep its low resistance even when coated with the above compound. Moreover, forming a perfluoropolyether or perfluoroalkyl chain on the membrane surface has improves lubricity, relaxing wear-caused physical damages on the surface. Coating the membrane surface, therefore, improves its wear resistance.

(2-5) Liquid-Repellent Agent for Post-Treatment

The liquid-repellent agents useful for the present invention and coating methods are described. Liquid-repellent agents More specifically, perfluoropolyether and perfluoroalkyl compounds having an alkoxy silane group at the terminal include the following Compounds 1 to 12:

(Formula 6)

$F\{CF(CF_3)-CF_2O\}_n-CF(CF_3)-CONH-(CH_2)_3-Si(OCH_2CH_3)_3$  Compound 1 n=6 to 48

(Formula 7)

$F\{CF(CF_3)-CF_2O\}_n-CF(CF_3)-CONH-(CH_2)_3-Si(OCH_3)_3$  Compound 2 n=6 to 48

(Formula 8)

$F\{CF_2CF_2CF_2O\}_n-CF_2CF_2-CONH-(CH_2)_3-Si(OCH_2CH_3)_3$  Compound 3 n=6 to 48

(Formula 9)

$F\{CF_2CF_2CF_2O\}_n-CF_2CF_2-CONH-(CH_2)_3-Si(OCH_3)_3$  Compound 4 n=6 to 48

(Formula 10)

$H(CF_2)_6-CONH-(CH_2)_3-Si(OCH_2CH_3)_3$  Compound 5

(Formula 11)

$H(CF_2)_6-CONH-(CH_2)_3-Si(OCH_3)_3$  Compound 6

(Formula 12)

$H(CF_2)_8-CONH-(CH_2)_3-Si(OCH_2CH_3)_3$  Compound 7

(Formula 13)

$H(CF_2)_8-CONH-(CH_2)_3-Si(OCH_3)_3$  Compound 8

(Formula 14)

$F(CF_2)_6(CH_2)_2-Si(OCH_3)_3$  Compound 9

(Formula 15)

$F(CF_2)_8-(CH_2)_2-Si(OCH_3)_3$  Compound 10

(Formula 16)

$F(CF_2)_6-(CH_2)_2-Si(OCH_2CH_3)_3$  Compound 11

(Formula 17)

$F(CF_2)_8-(CH_2)_2-Si(OCH_2CH_3)_3$  Compound 12

Of these, Compounds 1 to 8 can be produced by the methods, described below. Compounds 9 to 12 are supplied by Hydrus Chemical as 1H,1H,2H,2H-perfluorooctyltrimethoxy silane, 1H,1H,2H,2H-perfluorooctyltriethoxy silane, 1H,1H,2H,2H-perfluoroodecyltrimethoxy silane and 1H,1H,2H,2H-perfluorodecyltriethoxy silane, respectively. Daikin Industries' OPTOOL DSX is another commercial product. Compounds 1 to 4 have a fluorine chain as a polyfluoropolyether. The liquid-repellent membrane composed of the compound having a fluorine chain shows little deterioration in liquid repellency (by 5° or less) when immersed in a liquid, e.g., engine oil or gasoline in addition to water, for extended periods (1000 hours or so). These compounds are represented by the following general formula:

$[F\{CF(CF_3)-CF_2O\}_n-CF(CF_3)]-X-Si(OR)_3$ n=6 to 48

$\{F(CF_2CF_2CF_2O)_n\}-X-Si(OR)_3$ n=6 to 48    (Formula 18)

wherein, X is a site at which a perfluoropolyether chain and alkoxy silane residue are bound to each other, and R is an alkyl group.

Compounds 5 to 12 shows a contact angle with water decreasing, when immersed in engine oil or gasoline for extended periods (1000 hours or so), from around 110° before immersion to almost that of a plate.

(Synthesis of Compound 1)

First, 25 parts by weight of DuPont's Krytox 157FS-L (average molecular weight: 2500) was dissolved in 100 parts by weight of 3M's PF-5080, to which 20 parts by weight of thionyl chloride was added. The mixture was heated under reflux for 48 hours with stirring, and then thionyl chloride and PF-5080 were removed by an evaporator. This produced 25 parts by weight of acid chloride of Krytox 157FS-L. It was incorporated with 100 parts by weight of PF-5080, 3 parts by weight of Chisso's Sila-Ace S330 and 3 parts of triethyl amine, and the resulting mixture was stirred at room temperature for 20 hours. The reaction solution was filtered with a Showa Chemical Industry's filtration aid RADIOLITE, and PF-5080 was removed from the filtrate by evaporation. This produced 20 parts by weight of Compound 1.

(Synthesis of Compound 2)

Compound 2 (20 parts by weight) was synthesized in the same manner as was Compound 1, except that 3 parts by weight of Chisso's Sila-Ace S330 was replaced by 3 parts by weight of Chisso's Sila-Ace S360.

(Synthesis of Compound 3)

Compound 3 (30 parts by weight) was synthesized in the same manner as was Compound 1, except that 25 parts by weight of DuPont's Krytox 157FS-L (average molecular weight: 2500) was replaced by 35 parts by weight of Daikin Industries' DEMNUM SH (average molecular weight: 3500).

(Synthesis of Compound 4)

Compound 4 (30 parts by weight) was synthesized in the same manner as was Compound 1, except that 3 parts by weight of Chisso's Sila-Ace S330 was replaced by 3 parts by weight of Chisso's Sila-Ace S360 and 25 parts by weight of DuPont's Krytox 157FS-L (average molecular weight: 2500) was replaced by 35 parts by weight of Daikin Industries' DEMNUM SH (average molecular weight: 3500).

(Synthesis of Compound 5)

Compound 5 (3.5 parts by weight) was synthesized in the same manner as was Compound 1, except that 25 parts by weight of DuPont's Krytox 157FS-L (average molecular weight: 2500) was replaced by 3.5 parts by weight of Daikin Industries' 7H-dodecafluoroheptanoic acid (average molecular weight: 346.03).

(Synthesis of Compound 6)

Compound 6 (3.5 parts by weight) was synthesized in the same manner as was Compound 1, except that 25 parts by weight of DuPont's Krytox 157FS-L (average molecular weight: 2500) was replaced by 3.5 parts by weight of Daikin Industries' 7H-dodecafluoroheptanoic acid (average molecular weight: 346.03) and 2 parts by weight of Chisso's Sila-Ace S310 was replaced by 2 parts by weight of Chisso's Sila-Ace S320.

(Synthesis of Compound 7)

Compound 7 (4.5 parts by weight) was synthesized in the same manner as was Compound 1, except that 25 parts by weight of DuPont's Krytox 157FS-L (average molecular weight: 2500) was replaced by 4.5 parts by weight of Daikin Industries' 9H-hexadecafluorononanoic acid (average molecular weight: 446.07).

(Synthesis of Compound 8)

Compound 8 (4.5 parts by weight) was synthesized in the same manner as was Compound 1, except that 25 parts by weight of DuPont's Krytox 157FS-L (average molecular weight: 2500) was replaced by 4.5 parts by weight of Daikin Industries' Daikin Industries' 9H-hexadecafluorononanoic acid (average molecular weight: 446.07) and 2 parts by weight of Chisso's Sila-Ace S310 was replaced by 2 parts by weight of Chisso's Sila-Ace S20.

(b) Method for Forming a Liquid-Repellent Membrane

The method for forming a liquid-repellent membrane using a perfluoropolyether or perfluoroalkyl compound having an alkoxy silane group at the terminal is described. First, a perfluoropolyether or perfluoroalkyl compound having an alkoxy silane group at the terminal is dissolved in a solvent. Concentration of the solvent is generally in a range from 0.01 to 1.0% by weight or so, although varying how the solution is spread. The fluorine-based solvents useful for the present invention include FC-72, FC-77, PF-5060, PF-5080, HFE-7100 and HFE-7200 (3M), and Vertrel (DuPont). Thus, a solution dissolving a perfluoropolyether and perfluoroalkyl compounds is prepared (the solution is hereinafter referred to as liquid-repellent treatment solution).

Next, the anti-reflecting membrane is coated with the liquid-repellent treatment solution by a common method, e.g., dip coating or spin coating. Then, it is heated.

(3) Applicable Areas

The anti-reflecting membrane of the present invention can be formed on a transparent plate, e.g., that of glass, or polycarbonate or acryl resin.

Therefore, it is useful for those areas which are needed to efficiently take in sunlight while minimizing reflection. These areas include a transparent wall for greenhouses to stably and rapidly grow plants, and transparent wall for aquariums, because it can efficiently control reflection and enhance visibility of animals, plants, insects, fishes or the like to be observed or viewed.

Similarly, it is applicable to display apparatuses, e.g., liquid-crystal, plasma and organic electroluminescent (organic EL) displays, which are used for TV sets, cellular phones, car navigation systems, tachometers and the like, because it can control reflection of light and thereby enhance visibility. It is suitable to be placed on the outermost surface of the display screen of these apparatuses.

It is also applicable area to an anti-reflecting membrane for coating a solar cell panel surface to enhance solar energy conversion efficiency. Still more, it is also applicable to the outermost surface of optical storage media, because it can efficiently take in not only sunlight but also laser beams or the like.

The anti-reflecting membrane is characterized by its low resistance to prevent deposition or the like thereon, in addition to its high anti-reflecting capacity, and can keep high light transmittance and visibility even when working in a low-moisture atmosphere in winter or dusty atmosphere. Moreover, when provided with liquid repellency, it has improved antifouling characteristics, leading to further improved light transmittance and visibility. These characteristics make the anti-reflecting membrane of the present invention useful for building interior materials, e.g., clean room walls and partitions.

(i) Controlling Reflection

The anti-reflecting membrane of the present invention can keep its transparency even when formed on a transparent plate, e.g., that of glass, or polycarbonate or acryl resin. It is therefore applicable to display apparatuses, e.g., liquid-crystal, plasma and organic electroluminescent (organic EL) displays, which are used for TV sets, cellular phones, car navigation systems, tachometers and the like. It is also applicable to lenses, vehicle windows, and outermost members for vehicle illuminators and light-emitting elements.

(ii) Controlling Reflection of External and/or Internal Light for Display Apparatuses The anti-reflecting membrane of the present invention is located between a light source and outermost surface of an outermost plate surface, and can control reflection of light within a display apparatus, when formed at least one plane having an interface with air. It also can control reflection of external light, when formed on an outermost surface. It is applicable to any membrane/member combination, so long as the member has an interface between its surface and air. It may have a lower physical strength when formed on a surface other than an outermost surface then when formed on an outermost surface, so long as it satisfies an objective capacity for controlling reflection of light.

A plasma display provided with a front filter facing a light exit side of a front plate via an air layer can control reflection of external and internal light, when provided with the anti-reflecting membrane of the present invention at least on one of a light exit, light inlet and front glass surfaces. A display apparatus lacking an inside member having an interface with an air layer, e.g., that having no air layer between a front plate and front filter or having no front filter can control reflection of external light, when provided with the anti-reflecting membrane of the present invention on an outermost surface.

A liquid-crystal display with a polarizing plate not bonded to each of a pair of transparent plates between which a liquid-crystal layer is placed can control reflection of internal light, when provided with the anti-reflecting membrane of the present invention on a polarizing plate or transparent plate having an interface with an air layer.

(iii) Improving Brightness

A member constituting a back-light unit can have improved brightness, when provided with the anti-reflecting membrane of the present invention on one or both sides partly or totally, depending on its purposes, to enhance light transmittance. It is applicable to any membrane/member combination, so long as the member has an interface between its surface and air. A display which has a light source beside a panel and directs light to a target area by an optical waveguide, e.g., a small-to intermediate liquid-crystal display, can have improved brightness, when provided with the anti-reflecting membrane of the present invention on the waveguide. It can also have improved brightness, when provided with the anti-reflecting membrane of the present invention on the light source.

EXAMPLES

The present invention is described in detail by Examples. However, it is to be understood that scope of the present is by no means limited by Examples.

Example 1

First, the method for forming the anti-reflecting membrane on a glass plate is described.

(1) Pre-Treatment of Plate Before it is Coated With a Solution for Forming the Anti-Reflecting Membrane A glass plate (100 by 100 by 1.1 mm in size, refractive index: 1.50) was irradiated with ultraviolet ray, 10 mW in intensity, emitted from a low-voltage mercury lamp for 5 minutes. This decreased contact angle of the plate surface with water from 30 to 35° to 10° or less.

(2) Preparation of Solution for Forming the Anti-Reflecting Membrane

A coating solution for forming the anti-reflecting membrane (hereinafter referred to as anti-reflecting membrane forming solution) was prepared by mixing 3 parts by weight of a silica sol solution (kept acidic with phosphoric acid, solvent: water/ethanol (1/4), containing an alkoxy silane polymer at 2.5% by weight) as a binder and 4 parts by weight of a silicon oxide dispersion for fine inorganic oxide particles (IPA-ST, Nissan Chemical Industries, containing solids at 30% by weight) with 60 parts by weight of ethanol. It had a boiling point of 80° C.

IPA-ST is a dispersion containing spherical colloidal silica as silicon oxide having a diameter of 10 to 15 nm.

(3) Spreading the Anti-Reflecting Membrane Forming Solution

The anti-reflecting membrane forming solution was spread on the glass plate pre-treated in the step (1) by spin coating at 350 rpm for first 5 seconds and then at 1200 rpm for 20 seconds. Visual observation indicated that it was spread almost evenly.

(4) Heating

The coated plate was swiftly put in a constant-temperature bath kept at 160° C. inside, and heated therein for 10 minutes. This completed thermosetting of the silica sol after it was transformed into silicon oxide, producing the anti-reflecting membrane formed on the glass plate.

(5) Treatment of the Back Side

The coated plate was subjected to the above steps (1), (3) and (4) after it was turned over, to coat the back side similarly with the anti-reflecting membrane.

(6) Evaluation Test Results

The anti-reflecting membrane formed on each side of the glass plate had a thickness of 120 nm (average thickness of the membrane as a whole) and refractive index of 1.327, as determined by an ellipsometer (Mizoziri Kogaku Kogyo, DHA-OLK). The glass plate coated with the anti-reflecting membrane on each side had a reflectance of 3.1% versus 8% of the uncoated plate at a wavelength of 555 nm, at which men's luminosity factor attains a maximum, confirming that the membrane exhibited the anti-reflecting capacity.

Pores of 5 to 150 nm in size were found in the anti-reflecting membrane, as shown in FIG. 2 as a TEM-analyzed cross-sectional view. It was also observed that these pores were distributed more densely as membrane thickness increased toward the surface side, and found to a limited extent on the plate side. Therefore, Example 1 produced the membrane having a refractive index close to that of the solid membrane on the plate side and to that of air on the surface side. It is therefore considered that that the membrane prevents reflection of light in each interface with the plate or air, because of decreased differential refractive index between the dissimilar materials with the interface in-between. The similar pore distributions were observed in other Examples.

The anti-reflecting membrane had a surface resistance of $2\times10^{10}\Omega$ at 20° C. and a relative humidity of 50%, determined in accordance with ASTM D-257.

Example 2

An anti-reflecting membrane was formed in the same manner as in Example 1 (1) to (5), except that the glass plate was replaced by a single-crystalline sapphire plate (refractive index: 1.768).

The membrane was evaluated in the same manner as in Example 1 (6). It had a thickness of 120 nm and refractive index of 1.327.

The coated sapphire plate was measured for reflectance at a wavelength of 555 nm. It had a reflectance of below 0.3% versus 16% of the uncoated plate, confirming that the membrane exhibited the anti-reflecting capacity.

Pores of 5 to 150 nm in size were found in the cross-section of the membrane by a TEM, as was the case in Example 1.

The membrane had a surface resistance of $2\times10^{10}\Omega$ at 20° C. and a relative humidity of 50%.

Example 3

An anti-reflecting membrane was formed on a glass plate in the same manner as in Example 1 (1) to (5), except that 4 parts by weight of IPA-ST as a silicon oxide dispersion for preparation of anti-reflecting membrane forming solution was replaced by 4 parts by weight of IPA-ST-ZL (Nissan Chemical Industries), which is a dispersion of spherical colloidal silica as silicon oxide having a diameter of around 100 nm, containing solids at 30% by weight. The solution had a boiling point of 80° C.

The membrane was evaluated in the same manner as in Example 1 (6). It had a thickness of 190 nm and refractive index of 1.295.

The coated glass plate was measured for reflectance at a wavelength of 555 nm. It had a reflectance of 2.1% versus 8% of the uncoated plate, confirming that the membrane exhibited the anti-reflecting capacity.

Pores of 5 to 200 nm in size were found in the cross-section of the membrane by a TEM, as was the case in Example 1.

The membrane had a surface resistance of $5\times10^{10}\Omega$ at 20° C. and a relative humidity of 50%.

Example 4

An anti-reflecting membrane was formed on a glass plate in the same manner as in Example 1 (1) to (5), except that 4 parts by weight of IPA-ST as a silicon oxide dispersion for preparation of anti-reflecting membrane forming solution was replaced by 4 parts by weight of MT-ST (Nissan Chemical Industries), which is a dispersion of spherical colloidal silica as silicon oxide having a diameter of 10 to 15 nm, containing solids at 30% by weight. The solution had a boiling point of 79° C.

The membrane was evaluated in the same manner as in Example 1 (6). It had a thickness of 130 nm and refractive index of 1.328.

The coated glass plate was measured for reflectance at a wavelength of 555 nm. It had a reflectance of 5.1% versus 8% of the uncoated plate, confirming that the membrane exhibited the anti-reflecting capacity.

Pores of 5 to 200 nm in size were found in the cross-section of the membrane by a TEM, as was the case in Example 1.

The membrane had a surface resistance of $2\times10^{10}\Omega$ at 20° C. and a relative humidity of 50%.

Example 5

An anti-reflecting membrane was formed on a glass plate in the same manner as in Example 1 (1) to (5), except that 4 parts by weight of IPA-ST as a silicon oxide dispersion for preparation of anti-reflecting membrane forming solution was replaced by 4 parts by weight of IPA-ST-UP (Nissan Chemical Industries), which is a dispersion of chain-shaped colloidal silica as silicon oxide having a thickness of 9 to 30 nm, containing solids at 15% by weight. The solution had a boiling point of 80° C.

The membrane was evaluated in the same manner as in Example 1 (6). It had a thickness of 76 nm and refractive index of 1.241.

The coated glass plate was measured for reflectance at a wavelength of 555 nm. It had a reflectance of below 0.3% versus 8% of the uncoated plate, confirming that the membrane exhibited the anti-reflecting capacity.

Pores of 5 to 200 nm in size were found in the cross-section of the membrane by a TEM, as was the case in Example 1.

The membrane had a surface resistance of $3\times10^{10}\Omega$ at 20° C. and a relative humidity of 50%.

Example 6

An anti-reflecting membrane was formed on a glass plate in the same manner as in Example 5 (1) to (5), except that addition rate of IPA-ST-UP as a silicon oxide dispersion for preparation of anti-reflecting membrane forming solution was increased from 4 to 8 parts by weight. The solution had a boiling point of 80° C.

The membrane was evaluated in the same manner as in Example 1 (6). It had a thickness of 98 nm and refractive index of 1.200.

The coated glass plate was measured for reflectance at a wavelength of 555 nm. It had a reflectance of 0.6% versus 8% of the uncoated plate, confirming that the membrane exhibited the anti-reflecting capacity.

Pores of 5 to 150 nm in size were found in the cross-section of the membrane by a TEM, as was the case in Example 1.

The membrane had a surface resistance of $3\times10^{10}\Omega$ at 20° C. and a relative humidity of 50%.

In each of Examples 1, 3 and 6, the fine silicon oxide particles accounted for 94% of the membrane. The membrane prepared in Example 6 had a lower refractive index of 1.200 than those prepared in Examples 1 and 3, 1.327 and 1.255. The fine silicon oxide particles were spherical for Examples 1 and 3, whereas chain-shaped for Example 6. Example 5 achieved a lower membrane refractive index of 1.241 than Examples 1 and 3 even at a chain-shaped silicon oxide addition rate halved from that for Example 6, by which is meant that the chain-shaped particles are more preferable than the spherical particles.

Example 7

An anti-reflecting membrane was formed on a glass plate in the same manner as in Example 5 (1) to (5), except that addition rate of IPA-ST-UP as a silicon oxide dispersion for preparation of anti-reflecting membrane forming solution was decreased from 4 to 1.5 or 2 parts by weight. Each of the solutions had a boiling point of 80° C.

Each membrane was evaluated in the same manner as in Example 1 (6). The membrane from the former solution had a thickness and refractive index of 60 nm and 1.326, and the membrane from the latter solution had 67 nm and 1.281. The fine silicon oxide particles accounted for 75 and 80% of the membrane, respectively. The membrane prepared in Example 5 from the solution incorporated with IPA-ST-UP at 4 parts by weight had a thickness of 76 nm and refractive index of 1.241, and contained the fine silicon oxide particles at 89%. The membrane prepared in Example 6 from the solution incorporated with IPA-ST-UP at 8 parts by weight had a thickness of 98 nm and refractive index of 1.200, and contained the fine silicon oxide particles at 94%.

These results indicate that, when the chain-shaped silicon oxide particles are used, the membrane should contain the particles at 75% or more to have a refractive index of 1.33 or less.

Example 8

Next, the method for forming the anti-reflecting membrane on an acryl resin plate in place of glass plate is described.
(1) Pre-Treatment of Plate Before it is Coated with an Anti-Reflecting Membrane Forming Solution A 5 mm thick acryl resin plate (AS ONE CORP.) was cut into a 100 by 100 mm plate. It was coated with an anti-reflecting membrane by the following procedure. The plate had a refractive index of 1.52.

First, the plate was placed on a hot plate kept at 80° C., and irradiated with ultraviolet ray, 10 mW in intensity, emitted from a low-voltage mercury lamp for 10 minutes. This decreased contact angle of the plate surface with water from 90 to 92° to 40° or less.
(2) Preparation of Anti-Reflecting Membrane Forming Solution An anti-reflecting membrane forming solution was prepared by mixing 3 parts by weight of a silica sol solution (kept acidic with phosphoric acid, solvent: water/ethanol (1/4), containing an alkoxy silane polymer at 2.5% by weight) and 4 parts by weight of a silicon oxide dispersion for fine inorganic oxide particles (IPA-ST-UP, Nissan Chemical Industries, containing solids at 15% by weight) with 60 parts by weight of ethanol. It had a boiling point of 80° C.
(3) Spreading the Anti-Reflecting Membrane Forming Solution The anti-reflecting membrane forming solution was spread on the acryl resin plate pre-treated in the step (1) by spin coating at 350 rpm for first 5 seconds and then at 1200 rpm for 20 seconds. Visual observation indicated that it was spread almost evenly.
(4) Thermosetting The coated plate was swiftly put in a constant-temperature bath kept at 95° C. inside, and heated therein for 30 minutes. This completed thermosetting of the silica sol after it was transformed into silicon oxide, producing the anti-reflecting membrane formed on the acryl resin plate.
(5) Treatment of the Back Side The coated plate was subjected to the above steps (1), (3) and (4) after it was turned over, to coat the back side similarly with the anti-reflecting membrane.
(6) Evaluation Test Results The membrane was evaluated in the same manner as in Example 1 (6). It had a thickness of 86 nm and refractive index of 1.245.

The acryl resin plate coated with the anti-reflecting membrane on each side had a reflectance of below 0.3% versus 8% of the uncoated plate at a wavelength of 555 nm, confirming that the membrane exhibited the anti-reflecting capacity.

Pores of 5 to 150 nm in size were found in the cross-section of the membrane by a TEM, as was the case in Example 1.

The anti-reflecting membrane had a surface resistance of $3\times10^{10}\Omega$ at 20° C. and a relative humidity of 50%.

It is thus demonstrated also in Example 8 as well as in Examples 1 to 5 that the anti-reflecting membrane can be formed on a plate whether it is made of glass or acryl resin.

Example 9

Next, the method for forming the anti-reflecting membrane on a polycarbonate plate in place of glass plate is described.

(1) Pre-Treatment of Plate Before it is Coated with an Anti-Reflecting Membrane Forming Solution A 0.5 mm thick polycarbonate plate (Fujimoto Kagaku) was cut into a 200 by 200 mm plate. It was coated with an anti-reflecting membrane by the following procedure. The plate had a refractive index of 1.54.

First, the plate was placed on a hot plate kept at 80° C., and irradiated with ultraviolet ray, 10 mW in intensity, emitted from a low-voltage mercury lamp for 10 minutes. This decreased contact angle of the plate surface with water from 88 to 90° to 30° or less.

(2) Preparation of Anti-Reflecting Membrane Forming Solution

An anti-reflecting membrane forming solution was prepared by mixing 3 parts by weight of a silica sol solution (kept acidic with phosphoric acid, solvent: water/ethanol (1/4), containing an alkoxy silane polymer at 2.5% by weight) and 4 parts by weight of a silicon oxide dispersion for fine inorganic oxide particles (IPA-ST-UP, Nissan Chemical Industries, containing solids at 15% by weight) with 60 parts by weight of ethanol. It had a boiling point of 80° C.

(3) Spreading the Anti-Reflecting Membrane Forming Solution

The anti-reflecting membrane forming solution was spread on the polycarbonate plate pre-treated in the step (1) by spin coating at 350 rpm for first 5 seconds and then at 1200 rpm for 20 seconds. Visual observation indicated that it was spread almost evenly.

(4) Thermosetting

The coated plate was swiftly put in a constant-temperature bath kept at 120° C. inside, and heated therein for 20 minutes. This completed thermosetting of the silica sol after it was transformed into silicon oxide, producing the anti-reflecting membrane formed on the polycarbonate plate.

(5) Treatment of the Back Side

The coated plate was subjected to the above steps (1), (3) and (4) after it was turned over, to coat the back side similarly with the anti-reflecting membrane.

(6) Evaluation Test Results

The membrane was evaluated in the same manner as in Example 1 (6). It had a thickness of 82 nm and refractive index of 1.243.

The polycarbonate plate coated with the anti-reflecting membrane on each side had a reflectance of below 0.3% versus 8.4% of the uncoated plate at a wavelength of 555 nm, confirming that the membrane exhibited the anti-reflecting capacity.

Pores of 5 to 150 nm in size were found in the cross-section of the membrane by a TEM, as was the case in Example 1.

The anti-reflecting membrane had a surface resistance of $3 \times 10^{10} \Omega$ at 20° C. and a relative humidity of 50%.

It is thus demonstrated also in Example 9 as well as in Examples 1 to 5 and 8 that the anti-reflecting membrane can be formed on a plate whether it is made of glass, acryl resin or polycarbonate.

Example 10

Each of the plates coated with the anti-reflecting membrane, prepared in Examples 1 to 6, 8 and 9, was treated with a liquid-repellent solution.

(1) Preparation of Liquid-Repellent Solution

First, a 0.5% by weight of each of Compounds 1 to 12, dissolved in a solvent (Fluorinate PF-5080, 3M), was prepared as a liquid-repellent solution. A 0.1% by weight of each of Compounds 1 to 12, dissolved in a solvent (Fluorinate PF-5080, 3M), was also prepared (hereinafter the solution of Compound 1 is referred to as Liquid-Repellent Solution [1], the solution of compound 2 as Liquid-Repellent Solution [2], and so on).

For comparison, a 0.1% by weight solution of CYTOP CTL-107M (Asahi Glass) was prepared as Liquid-Repellent Solution [13].

(2) Method for Treatment with a Liquid-Repellent Solution

With Liquid-Repellent Solutions [1] to [12]

The coated plate was immersed in each liquid-repellent solution for 3 minutes, taken out from the solution, and then put in a constant-temperature bath kept at 95° C. inside for 30 minutes. It was taken out from the bath, and surface-rinsed with PF-5080 to remove the excess liquid-repellent solution. This completed the treatment with the liquid-repellent solution.

With Liquid-Repellent Solution [13]

The coated plate was immersed in each liquid-repellent solution for 3 minutes, taken out from the solution, and then put in a constant-temperature bath kept at 95° C. inside for 90 minutes. It was taken out from the bath. This completed the treatment with the liquid-repellent solution.

(3) Evaluation of Liquid Repellency

The treated plate was evaluated for liquid repellency of the surface by contact angle with water. The results are given in Tables 1 to 8.

TABLE 1

Treatment of the plate coated in Example 1

| Situations of the treatment with the liquid-repellent solution | Contact angle (°) | Refractive index | Reflectance (%) at 555 nm | Membrane resistance ($\times 10^{10} \Omega$) | Pencil hardness |
|---|---|---|---|---|---|
| Before treatment | Below 10 | 1.327 | 3.1 | 2 | 2H |
| After treatment Numerals in the parentheses [ ] are liquid-repellent solution numbers [1] | 90 | 1.327 | 3.1 | 2 | 3H |
| [2] | 90 | 1.327 | 3.1 | 2 | 3H |
| [3] | 108 | 1.327 | 3.1 | 2 | 3H |
| [4] | 108 | 1.327 | 3.1 | 2 | 3H |
| [5] | 82 | 1.327 | 3.1 | 2 | 3H |
| [6] | 82 | 1.327 | 3.1 | 2 | 3H |
| [7] | 84 | 1.327 | 3.1 | 2 | 3H |
| [8] | 84 | 1.327 | 3.1 | 2 | 3H |
| [9] | 86 | 1.327 | 3.1 | 2 | 3H |
| [10] | 88 | 1.327 | 3.1 | 2 | 3H |
| [11] | 86 | 1.327 | 3.1 | 2 | 3H |
| [12] | 88 | 1.327 | 3.1 | 2 | 3H |
| [13] | 105 | 1.327 | 3.1 | $10^6$ or more | 2H |

TABLE 2

Treatment of the plate coated in Example 2

| Situations of the treatment with the liquid-repellent solution | Contact angle (°) | Refractive index | Reflectance (%) at 555 nm | Membrane resistance ($\times 10^{10} \Omega$) | Pencil hardness |
|---|---|---|---|---|---|
| Before treatment | Below 10 | 1.327 | Below 0.3 | 2 | 2H |
| After treatment Numerals in the parentheses [ ] are liquid-repellent solution [1] | 88 | 1.327 | Below 0.3 | 2 | 3H |
| [2] | 88 | 1.327 | Below 0.3 | 2 | 3H |
| [3] | 105 | 1.327 | Below 0.3 | 2 | 3H |
| [4] | 105 | 1.327 | Below 0.3 | 2 | 3H |
| [5] | 78 | 1.327 | Below 0.3 | 2 | 3H |
| [6] | 78 | 1.327 | Below 0.3 | 2 | 3H |
| [7] | 81 | 1.327 | Below 0.3 | 2 | 3H |
| [8] | 81 | 1.327 | Below 0.3 | 2 | 3H |
| [9] | 84 | 1.327 | Below 0.3 | 2 | 3H |
| [10] | 86 | 1.327 | Below 0.3 | 2 | 3H |

TABLE 2-continued

Treatment of the plate coated in Example 2

| Situations of the treatment with the liquid-repellent solution | | Contact angle (°) | Refractive index | Reflectance (%) at 555 nm | Membrane resistance (×$10^{10}$ Ω) | Pencil hardness |
|---|---|---|---|---|---|---|
| numbers | [11] | 84 | 1.327 | Below 0.3 | 2 | 3H |
|  | [12] | 86 | 1.327 | Below 0.3 | 2 | 3H |
|  | [13] | 86 | 1.327 | Below 0.3 | $10^6$ or more | 2H |

TABLE 3

Treatment of the plate coated in Example 3

| Situations of the treatment with the liquid-repellent solution | | Contact angle (°) | Refractive index | Reflectance (%) at 555 nm | Membrane resistance (×$10^{10}$ Ω) | Pencil hardness |
|---|---|---|---|---|---|---|
| Before treatment | | Below 10 | 1.295 | 2.1 | 5 | 2H |
| After | [1] | 90 | 1.295 | 2.1 | 5 | 3H |
| treatment | [2] | 90 | 1.295 | 2.1 | 5 | 3H |
| Numerals | [3] | 108 | 1.295 | 2.1 | 5 | 3H |
| in the | [4] | 108 | 1.295 | 2.1 | 5 | 3H |
| parentheses | [5] | 82 | 1.295 | 2.1 | 5 | 3H |
| [ ] are | [6] | 82 | 1.295 | 2.1 | 5 | 3H |
| liquid- | [7] | 84 | 1.295 | 2.1 | 5 | 3H |
| repellent | [8] | 84 | 1.295 | 2.1 | 5 | 3H |
| solution | [9] | 86 | 1.295 | 2.1 | 5 | 3H |
| numbers | [10] | 88 | 1.295 | 2.1 | 5 | 3H |
|  | [11] | 86 | 1.295 | 2.1 | 5 | 3H |
|  | [12] | 88 | 1.295 | 2.1 | 5 | 3H |
|  | [13] | 88 | 1.295 | 2.1 | $10^6$ or more | 2H |

TABLE 4

Treatment of the plate coated in Example 4

| Situations of the treatment with the liquid-repellent solution | | Contact angle (°) | Refractive index | Reflectance (%) at 555 nm | Membrane resistance (×$10^{10}$ Ω) | Pencil hardness |
|---|---|---|---|---|---|---|
| Before treatment | | Below 10 | 1.328 | 3.2 | 2 | 2H |
| After | [1] | 90 | 1.328 | 3.2 | 2 | 3H |
| treatment | [2] | 90 | 1.328 | 3.2 | 2 | 3H |
| Numerals | [3] | 108 | 1.328 | 3.2 | 2 | 3H |
| in the | [4] | 108 | 1.328 | 3.2 | 2 | 3H |
| parentheses | [5] | 82 | 1.328 | 3.2 | 2 | 3H |
| [ ] are | [6] | 82 | 1.328 | 3.2 | 2 | 3H |
| liquid- | [7] | 84 | 1.328 | 3.2 | 2 | 3H |
| repellent | [8] | 84 | 1.328 | 3.2 | 2 | 3H |
| solution | [9] | 86 | 1.328 | 3.2 | 2 | 3H |
| numbers | [10] | 88 | 1.328 | 3.2 | 2 | 3H |
|  | [11] | 86 | 1.328 | 3.2 | 2 | 3H |
|  | [12] | 88 | 1.328 | 3.2 | 2 | 3H |
|  | [13] | 88 | 1.328 | 3.2 | $10^6$ or more | 2H |

TABLE 5

Treatment of the plate coated in Example 5

| Situations of the treatment with the liquid-repellent solution | | Contact angle (°) | Refractive index | Reflectance (%) at 555 nm | Membrane resistance (×$10^{10}$ Ω) | Pencil hardness |
|---|---|---|---|---|---|---|
| Before treatment | | Below 10 | 1.241 | Below 0.3 | 3 | 2H |
| After | [1] | 90 | 1.241 | Below 0.3 | 3 | 3H |
| treatment | [2] | 90 | 1.241 | Below 0.3 | 3 | 3H |
| Numerals | [3] | 108 | 1.241 | Below 0.3 | 3 | 3H |
| in the | [4] | 108 | 1.241 | Below 0.3 | 3 | 3H |
| parentheses | [5] | 82 | 1.241 | Below 0.3 | 3 | 3H |
| [ ] are | [6] | 82 | 1.241 | Below 0.3 | 3 | 3H |
| liquid- | [7] | 84 | 1.241 | Below 0.3 | 3 | 3H |
| repellent | [8] | 84 | 1.241 | Below 0.3 | 3 | 3H |
| solution | [9] | 86 | 1.241 | Below 0.3 | 3 | 3H |
| numbers | [10] | 88 | 1.241 | Below 0.3 | 3 | 3H |
|  | [11] | 86 | 1.241 | Below 0.3 | 3 | 3H |
|  | [12] | 88 | 1.241 | Below 0.3 | 3 | 3H |
|  | [13] | 88 | 1.241 | Below 0.3 | $10^6$ or more | 2H |

TABLE 6

Treatment of the plate coated in Example 6

| Situations of the treatment with the liquid-repellent solution | | Contact angle (°) | Refractive index | Reflectance (%) at 555 nm | Membrane resistance (×$10^{10}$ Ω) | Pencil hardness |
|---|---|---|---|---|---|---|
| Before treatment | | Below 10 | 1.2 | 0.6 | 2 | H |
| After | [1] | 90 | 1.2 | 0.6 | 2 | 3H |
| treatment | [2] | 90 | 1.2 | 0.6 | 2 | 3H |
| Numerals | [3] | 108 | 1.2 | 0.6 | 2 | 3H |
| in the | [4] | 108 | 1.2 | 0.6 | 2 | 3H |
| parentheses | [5] | 82 | 1.2 | 0.6 | 2 | 3H |
| [ ] are | [6] | 82 | 1.2 | 0.6 | 2 | 3H |
| liquid- | [7] | 84 | 1.2 | 0.6 | 2 | 3H |
| repellent | [8] | 84 | 1.2 | 0.6 | 2 | 3H |
| solution | [9] | 86 | 1.2 | 0.6 | 2 | 3H |
| numbers | [10] | 88 | 1.2 | 0.6 | 2 | 3H |
|  | [11] | 86 | 1.2 | 0.6 | 2 | 3H |
|  | [12] | 88 | 1.2 | 0.6 | 2 | 3H |
|  | [13] | 88 | 1.2 | 0.6 | $10^6$ or more | H |

TABLE 7

Treatment of the plate coated in Example 7

| Situations of the treatment with the liquid-repellent solution | | Contact angle (°) | Refractive index | Reflectance (%) at 555 nm | Membrane resistance (×$10^{10}$ Ω) | Pencil hardness |
|---|---|---|---|---|---|---|
| Before treatment | | Below 10 | 1.245 | Below 0.3 | 3 | H |
| After | [1] | 92 | 1.245 | Below 0.3 | 3 | 2H |
| treatment | [2] | 92 | 1.245 | Below 0.3 | 3 | 2H |
| Numerals | [3] | 108 | 1.245 | Below 0.3 | 3 | 2H |
| in the | [4] | 108 | 1.245 | Below 0.3 | 3 | 2H |
| parentheses | [5] | 84 | 1.245 | Below 0.3 | 3 | 2H |
| [ ] are | [6] | 84 | 1.245 | Below 0.3 | 3 | 2H |
| liquid- | [7] | 86 | 1.245 | Below 0.3 | 3 | 2H |
| repellent | [8] | 86 | 1.245 | Below 0.3 | 3 | 2H |
| solution | [9] | 89 | 1.245 | Below 0.3 | 3 | 2H |
| numbers | [10] | 90 | 1.245 | Below 0.3 | 3 | 2H |
|  | [11] | 89 | 1.245 | Below 0.3 | 3 | 2H |
|  | [12] | 90 | 1.245 | Below 0.3 | 3 | 2H |
|  | [13] | 90 | 1.245 | Below 0.3 | $10^6$ or more | H |

TABLE 8

Treatment of the plate coated in Example 8

| Situations of the treatment with the liquid-repellent solution | | Contact angle (°) | Refractive index | Reflectance (%) at 555 nm | Membrane resistance (×10$^{10}$ Ω) | Pencil hardness |
|---|---|---|---|---|---|---|
| Before treatment | | Below 10 | 1.243 | Below 0.3 | 3 | H |
| After treatment Numerals in the parentheses [ ] are liquid-repellent solution numbers | [1]  | 91  | 1.243 | Below 0.3 | 3 | 2H |
| | [2]  | 91  | 1.243 | Below 0.3 | 3 | 2H |
| | [3]  | 108 | 1.243 | Below 0.3 | 3 | 2H |
| | [4]  | 108 | 1.243 | Below 0.3 | 3 | 2H |
| | [5]  | 83  | 1.243 | Below 0.3 | 3 | 2H |
| | [6]  | 83  | 1.243 | Below 0.3 | 3 | 2H |
| | [7]  | 84  | 1.243 | Below 0.3 | 3 | 2H |
| | [8]  | 84  | 1.243 | Below 0.3 | 3 | 2H |
| | [9]  | 88  | 1.243 | Below 0.3 | 3 | 2H |
| | [10] | 90  | 1.243 | Below 0.3 | 3 | 2H |
| | [11] | 88  | 1.243 | Below 0.3 | 3 | 2H |
| | [12] | 90  | 1.243 | Below 0.3 | 3 | 2H |
| | [13] | 90  | 1.243 | Below 0.3 | 10$^6$ or more | H |

Contact angle of the untreated plate with water, and refractive index, reflectance and pencil hardness before and after the treatment are also given in these tables.

Each of the anti-reflecting membranes showed a contact angle of below 10° with water before it was treated with the liquid-repellent solution. The treatment increased the angle, but was confirmed to have no effect on refractive index or reflectance, because these properties remained unchanged before and after the treatment.

However, the treatment with the 0.1% by weight solution in CYTOP CTL-107M increased resistance. CYTOP CTL-107M covered the anti-reflecting membrane almost totally, whereas each of Compounds 1 to 12 was bound to the membrane surface in places via the alkoxy silane group at the liquid-repellent fluorine-based chain, with the result that it did not cover the membrane totally. The membrane of higher resistance will be charged more easily, to promote deposition of dust or the like thereon. Therefore, Compounds 1 to 12 are more suitable, because they can keep the membrane more resistant to deposition of dust or the like.

It is thus demonstrated that a fluorine compound having an alkoxy silane group at the terminal is suitable, because it can impart liquid repellency to the membrane while controlling increase of its resistance.

Moreover, the membrane surface showed an increased pencil hardness, when treated with each of Compounds 1 to 12 for liquid-repellency. By contrast, the membrane treated with CYTOP CTL-107M showed a pencil hardness on a level with that of the untreated one. It is therefore apparent that the treatment for liquid repellency also improves wear resistance of compounds for the liquid-repellency treatment, Compounds 1 to 4 tend to give a higher contact angle, the lowest level observed being 880 of the membrane prepared in Example 2 treated with Compound 1 or 2. In particular, both Compounds 3 and 4 give a higher contact angle of 1000 or more. Compounds 1 to 4 have a perfluoropolyether chain, whereas the others have a perfluoroalkyl or fluoroalkyl chain, based on which it is considered that treatment with the compound having a perfluoropolyether chain can give the membrane of higher liquid repellency.

Example 11

An anti-reflecting membrane was formed on an acryl resin plate on both sides in the same manner as in Example 8 (1) to (5), except that addition rate of ethanol was decreased from 60 to 30 parts by weight, and plate size was increased from 100 by 100 to 500 by 500 mm.

The membrane was evaluated in the same manner as in Example 1 (6). The membrane had a thickness of 140 nm and refractive index of 1.245.

Next, the acryl resin plate coated with the anti-reflecting membrane was measured for reflectance at a wavelength of 700 nm.

P700 as one type of chlorophyll present in leaves is an important factor which drives the electron transfer cycle in a plant photosynthesis cycle. Irradiation of leaves with light of a wavelength of around 700 nm accelerates the photosynthesis cycles therein. Therefore, photosynthesis proceeds faster, when leaves are irradiated with more light of a wavelength of around 700 nm.

The acryl resin plate coated with the anti-reflecting membrane had a reflectance of below 0.3% versus 8.1% of the uncoated plate, confirming that the membrane exhibited the anti-reflecting capacity.

Figure 4:
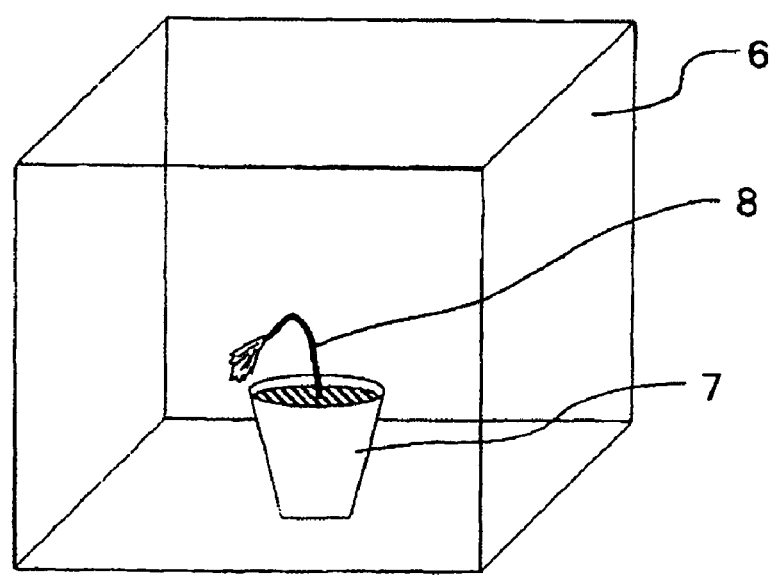
FIG. 4 is a greenhouse provided with the anti-reflecting membrane(s).

Next, a couple of the acrylic plates each coated with the anti-reflecting membrane were prepared, and used to assemble a greenhouse, illustrated in FIG. 4.

In the greenhouse 6, a tomato seedling 8 (variety: petit tomato) was raised in a plant pot 7. The uncoated acryl resin plates were also used to assemble a greenhouse of the same size. The tomato seedlings grown to almost the same extent were put in each of these greenhouses in early May in such a way that they were irradiated with sunlight to essentially the same extent. The seedling put in the greenhouse with the coated acryl resin plates bore the red fruit on June 15, but that in the greenhouse with the uncoated plates did on July 3, confirming that the anti-reflecting membrane has an effect of accelerating growth of the plant.

Example 12

Two acryl resin plates, 500 by 500 by 5 mm in size, were prepared, where one was coated with the anti-reflecting membrane on one side in the same manner as in Example 11 and the other was not. They were set acock at 45° on the edge of a 12-mat bed room with 2 beds at the center. They were detached carefully not to scatter dust deposited thereon and weighed 30 days after they were set. Then, they were cleaned and weighed again to determine quantity of dust by the differential weight. It was found that 22 mg of dust was deposited on the uncoated plate, whereas 5 mg on the coated plate. The uncoated plate had a surface resistance of 1×10$^{16}$Ω or more, whereas the coated plate had 3×10$^9$ Ω. It is thus confirmed that the coated plate is highly dust-repellent, because the anti-reflecting membrane thereon decreases surface resistance to control dust deposition, and that it is suitable for building interior materials, e.g., those for living spaces, and clean room walls and partitions.

Example 13

An anti-reflecting membrane was formed on a polycarbonate plate only on the front side in the same manner as in Example 9 (1) to (4), except that addition rate of ethanol was increased from 60 to 80 parts by weight.

Next, the polycarbonate plate coated with the anti-reflecting membrane was measured for reflectance at a wavelength of 405 nm. Light having a wavelength of 405 nm has been used recently in reproduction of DVD records to increase recording density. It is therefore necessary, when a plate of high reflectance at this wavelength is used for disks, to increase intensity of light for recording and reproduction. Light intensity can be increased at the same laser output by increasing light irradiation time at each pit. This however has a harmful impact on high-speed recording and reproduction. Therefore, decreasing reflectance of light of this wavelength is one of the techniques for high-speed recording and reproduction.

The polycarbonate plate coated with the anti-reflecting membrane in Example 13 had a reflectance of below 0.3% on the coated side versus 4.2% on the uncoated side, confirming that the membrane exhibited the anti-reflecting capacity.

Figure 5:
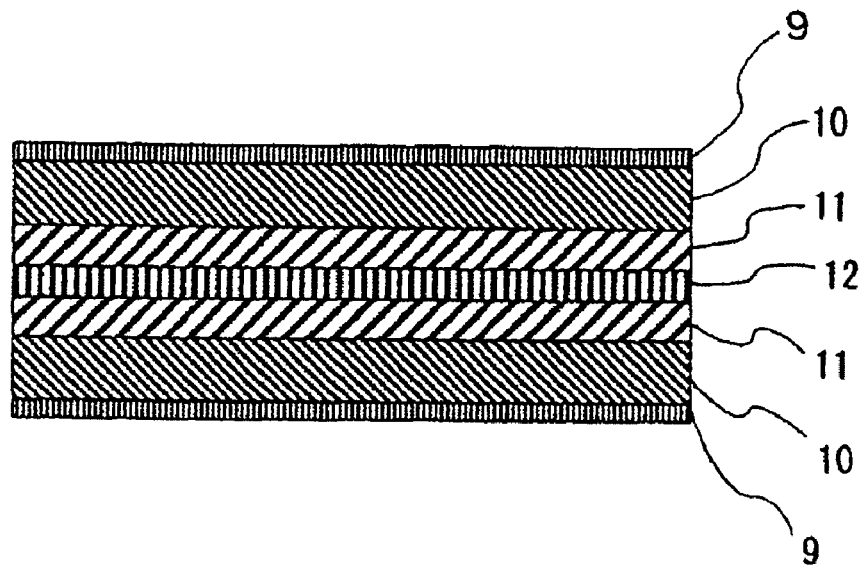
FIG. 5 is a DVD disk provided with the anti-reflecting membrane.

Next, another coated plate was prepared. These plates were cut to have two circular plates (diameter: 120 mm), to prepare a DVD disk with protective layers and a recording layer in-between. FIG. 5 schematically illustrates the disk.

The DVD disk was composed of the polycarbonate plates 10, each coated with the anti-reflecting membrane 9, holding the protective layers 11 and recording layer 12 in-between. Data were wrote in the disk and reproduced with the aid of light having an intensity of 0.5 mW, which is half that for a common disk. The disk reproduced the data correctly. By contrast, a common disk would erroneously reproduce them with such low-intensity light, because of increased reflection by the surface to weaken reading-out light reaching a playback unit's light-receiving section, although not causing the problems with light having an intensity of 1 mW. On the other hand, the disk provided with the anti-reflecting membrane of the present invention controls reflection to a much lower extent to allow reading-out light to reach the light-receiving section almost totally. This conceivably prevents the above problems.

As discussed above, it is thus confirmed that the DVD disk provided with the anti-reflecting membrane of the present invention can give a high-sensitivity optical storage medium capable of reading out even when the disk works with light having an intensity half that for a common disk.

Example 14

An anti-reflecting membrane was formed on a glass plate on both sides in the same manner as in Example 5, except that the glass plate of 100 by 100 by 1.1 mm in size and having a refractive index of 1.50 was replaced by a glass plate of 460 by 770 by 4 mm in size and having a refractive index of 1.52.

Next, the coated glass plate was set on a 32-type plasma TV monitor (Hitachi, W32-P5000) in place of an outermost glass plate. This monitor is one of the display apparatuses of the present invention. This monitor and another one not covered with the coated glass plate were set by a window in such a way that sunlight hit them to the same extent. It was observed that reflection of ambient objects in the display screen was essentially not noticeable in the former monitor by virtue of controlled reflection of sunlight entering the anti-reflecting membrane, unlike in the latter monitor.

It is thus demonstrated that the glass plate coated with the anti-reflecting membrane of the present invention can give a plasma TV monitor capable of controlling reflection of ambient objects in the display screen to an essentially unnoticeable extent and displaying clear images even under strong sunlight.

Example 15

An anti-reflecting membrane was formed on an acryl resin plate on both sides in the same manner as in Example 8, except that the acryl resin plate of 100 by 100 mm in size was replaced by an acryl resin plate of 460 by 770 mm in size.

Figure 6:
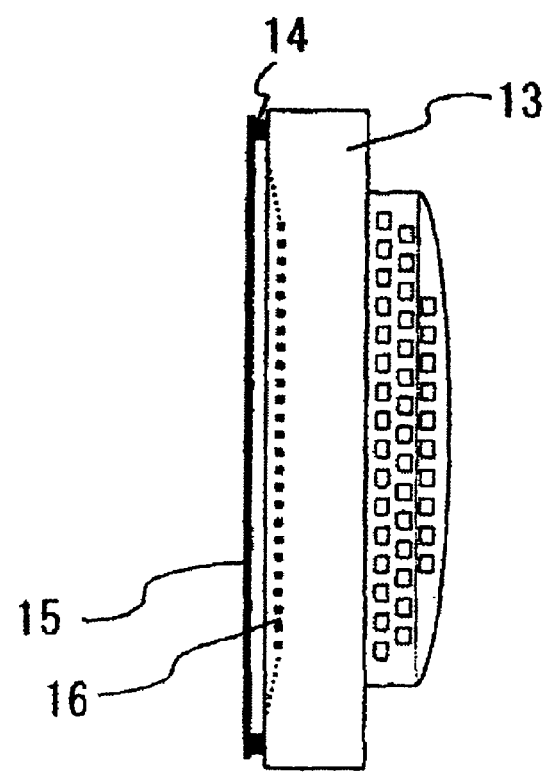
FIG. 6 outlines the top view of a display apparatus.

Next, the coated acryl resin plate was set on a 32-type liquid-crystal TV monitor (Hitachi, W32-L5000) on the outermost surface, as illustrated in FIG. 6. This monitor is one of the display apparatuses of the present invention. The acryl resin plate 15 coated with the anti-reflecting membrane on both sides was set on the monitor 13 via the 1 mm high spacer 14. The monitor 13 was provided with the polarizing plate 16 on the outermost surface, which was surface-roughened to scatter reflected light.

This monitor and another one covered with the uncoated acryl resin plate were set by a window in such a way that sunlight hit them to the same extent. It was observed that reflection of ambient objects in the display screen was essentially not noticeable in the former monitor by virtue of controlled reflection of sunlight entering the anti-reflecting membrane, unlike in the latter monitor.

It is thus demonstrated that the acryl resin plate coated with the anti-reflecting membrane of the present invention can give a liquid-crystal TV monitor capable of controlling reflection of ambient objects in the display screen to an essentially unnoticeable extent and displaying clear images even under strong sunlight.

Thus, the anti-reflecting membrane of the present invention works as an anti-reflecting membrane for display apparatuses, as demonstrated in Examples 14 and 15.

Example 16

The two 32-type liquid-crystal TV monitors used in Example 15 were tested for impact resistance of the display screen covered with the acrylic plate, where one was coated with the anti-reflecting membrane and the other not.

These monitors were set on the floor with the display screen facing the ceiling, on which an iron ball (diameter: 50 mm) was dropped from a height of 1 m. Then, each monitor was switched on to display images. The monitor covered with the uncoated acrylic plate could not normally display images, because the iron ball hit the polarizing plate on the display screen and broke the glass inside. On the other hand, the monitor covered with the coated acrylic plate normally displayed images. The area hit by the iron ball was damaged slightly, but to an extent not posing a problem for watching images.

Thus, it is confirmed that the transparent plate coated with the anti-reflecting membrane improves impact resistance of a display apparatus which it protects.

Example 17

An anti-reflecting membrane was formed on a glass plate on one side in the same manner as in Example 1 (1), (3) and (5), except that the glass plate of 100 by 100 by 1.1 mm in size and having a refractive index of 1.50 was replaced by a glass plate of 43 by 34 by 0.3 mm in size and having a refractive index of 1.52, and that the plate was coated with the anti-reflecting membrane forming solution prepared in Example 5.

Next, the coated glass plate was attached to a cellular phone by polyisobutylene as an adhesive agent on its polarizing plate, after an acryl plate on the outermost display surface was removed.

Figure 7:
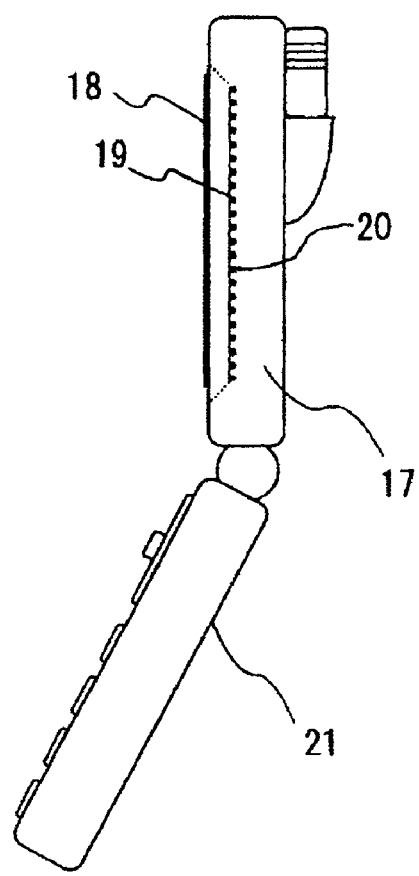
FIG. 7 outlines a cellular phone structure.

Subsequently, an anti-reflecting membrane was formed on an acryl resin plate on both sides in the same manner as in Example 8 (1), (3) and (5), except that the acryl resin plate of 100 by 100 by 5 mm in size was replaced by the acryl resin plate removed from the cellular phone. The coated plate was then set on the phone. This prepared the cellular phone provided with the anti-reflecting membrane. FIG. 7 illustrates one structure of the cellular phone.

The display screen 17 was coated with the polarizing plate 20, a glass plate 19 coated with the anti-reflecting membrane on one side, and an acryl resin plate 18 coated with the anti-reflecting membrane on both sides in this order, with the acryl resin plate 18 serving as the outermost surface. The cellular phone was operated by the operating section 21.

The above cellular phone and a phone provided with no anti-reflecting membrane were exposed to direct sunlight. Images were difficult to watch in the phone provided with no anti-reflecting membrane, because of strong reflection of ambient objects in its display screen. In the phone provided with the anti-reflecting membranes, on the other hand, images were easily watched, because of weak reflection of ambient objects in the screen even when it was directly hit by sunlight. It is thus demonstrated that images are easily watched in the phone provided with the anti-reflecting membranes, because of weak reflection of ambient objects in the screen even when it is directly hit by sunlight.

Reflection of ambient objects in the screen was slightly noticeable in the phone with the acryl resin plate not coated with the anti-reflecting membrane, but controlled by virtue of the glass plated coated with the anti-reflecting membrane, set on the polarizing plate.

The anti-reflecting membrane can exhibit the similar effect also for PDAs and the like, which have a display screen of similar structure.

It is thus demonstrated that a mobile display device provided with the anti-reflecting membrane of the present invention has a high-visibility display screen, because reflection of ambient objects is controlled even in the outdoors where it is directly exposed to strong sunlight.

Example 18

Figure 8:
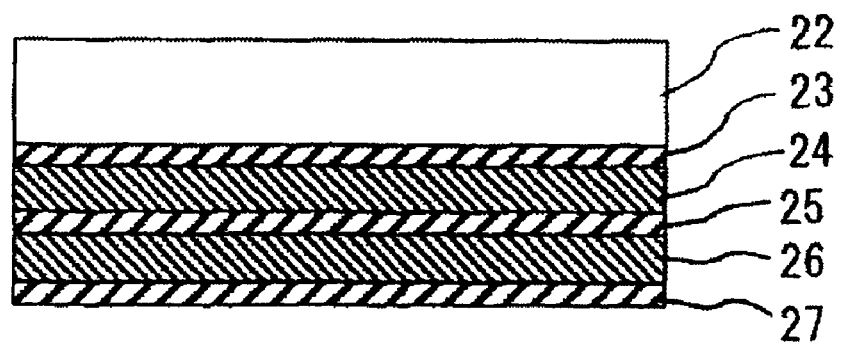
FIG. 8 schematically illustrates a solar energy converting device structure.

An anti-reflecting membrane was formed on a glass plate in the same manner as in Example 5, except that the glass plate of 100 by 100 by 1.1 mm in size and having a refractive index of 1.50 was replaced by a glass plate removed from a solar energy converting device. The coated plate was then set on the device. FIG. 8 schematically illustrates one structure of the solar energy converting device.

The solar energy converting device comprises the glass substrate 22 coated with the anti-reflecting membrane, surface electrode 23, upper photon-electron converter 24, middle transparent electrode 25, lower photon-electron converter 26 and bottom electrode 27, in this order.

This device and another one not provided with the anti-reflecting membrane were set in such a way that sunlight hit them to essentially the same extent, and power output by each device was measured. It was observed that the device provided with the anti-reflecting membrane produced around 10% more power than the other. The coated glass plate had an average reflectance of 0.5% in a wavelength range from 400 to 700 nm, versus 10% of the uncoated one. The device provided with the anti-reflecting membrane produced more power, conceivably because it took more sunlight in the photon-electron converters by controlling the reflection.

It is thus demonstrated that the solar energy converting device provided with the anti-reflecting membrane produces power more efficiently by virtue of controlled reflection of light by the glass plate surface.

Example 19

An anti-reflecting membrane forming solution was prepared in the same manner as in Example 1, except that 3 parts by weight of the silica sol solution was replaced by 0.1 parts by weight of aminopropyltriethoxy silane (Chisso, S330) and 4 parts by weight of IPA-ST (Nissan Chemical Industries) as a silicon oxide dispersion was replaced by 4 parts by weight of IPA-ST-UP (Nissan Chemical Industries).

Then, an anti-reflecting membrane was formed on a glass plate in the same manner as in Example 1 (1) and (3) to (5), except that the anti-reflecting membrane forming solution was replaced by the above solution. The membrane was evaluated in the same manner as in Example 1 (6). It had a thickness of 80 nm and refractive index of 1.251. It had a reflectance of below 0.3% at a wavelength of 555 nm. Pores of 5 to 150 nm in size were found in the cross-section of the membrane by a TEM, as shown in FIG. 2.

The membrane had a surface resistance of $2 \times 10^{10} \Omega$ at 20° C. and a relative humidity of 50%.

Example 20

An anti-reflecting membrane forming solution was prepared in the same manner as in Example 1, except that 3 parts by weight of the silica sol solution was replaced by 0.1 parts by weight of N-(2-aminoethyl)-3-aminopropyltriethoxy silane (Chisso, S320) and 4 parts by weight of IPA-ST (Nissan Chemical Industries) as a silicon oxide dispersion was replaced by 4 parts by weight of IPA-ST-UP (Nissan Chemical Industries).

Then, an anti-reflecting membrane was formed on a glass plate in the same manner as in Example 1 (1) and (3) to (5), except that the anti-reflecting membrane forming solution was replaced by the above solution. The membrane was evaluated in the same manner as in Example 1 (6). It had a thickness of 81 nm and refractive index of 1.252. It had a reflectance of below 0.3% at a wavelength of 555 nm. Pores of 5 to 160 nm in size were found in the cross-section of the membrane by a TEM, as shown in FIG. 2.

The membrane had a surface resistance of $2 \times 10^{10} \Omega$ at 20° C. and a relative humidity of 50%.

Example 21

An anti-reflecting membrane forming solution was prepared in the same manner as in Example 1, except that 3 parts by weight of the silica sol solution was replaced by 0.1 parts by weight of 3-chloropropyltrimethoxy silane (Chisso, S620) and 4 parts by weight of IPA-ST (Nissan Chemical Industries) as a silicon oxide dispersion was replaced by 4 parts by weight of IPA-ST-UP (Nissan Chemical Industries).

Then, an anti-reflecting membrane was formed on a glass plate in the same manner as in Example 1 (1) and (3) to (5), except that the anti-reflecting membrane forming solution was replaced by the above solution. The membrane was evaluated in the same manner as in Example 1 (6). It had a thickness of 78 nm and refractive index of 1.246. It had a reflectance of below 0.3% at a wavelength of 555 nm. Pores of 5 to 160 nm in size were found in the cross-section of the membrane by a TEM, as shown in FIG. 2.

The membrane had a surface resistance of $3 \times 10^{10} \Omega$ at 20° C. and a relative humidity of 50%.

Example 22

An anti-reflecting membrane forming solution was prepared in the same manner as in Example 1, except that 3 parts by weight of the silica sol solution was replaced by 0.1 parts by weight of 3-mercaptopropyltriethoxy silane (Chisso, S810) and 4 parts by weight of IPA-ST (Nissan Chemical Industries) as a silicon oxide dispersion was replaced by 4 parts by weight of IPA-ST-UP (Nissan Chemical Industries).

Then, an anti-reflecting membrane was formed on a glass plate in the same manner as in Example 1 (1) and (3) to (5), except that the anti-reflecting membrane forming solution was replaced by the above solution. The membrane was evaluated in the same manner as in Example 1 (6). It had a thickness of 82 nm and refractive index of 1.252. It had a reflectance of below 0.3% at a wavelength of 555 nm. Pores of 5 to 180 nm in size were found in the cross-section of the membrane by a TEM, as shown in FIG. 2.

The membrane had a surface resistance of $2\times10^{10}\Omega$ at 20° C. and a relative humidity of 50%.

It is thus demonstrated also in Example 22 as well as in Examples 19 to 21 that the silicon compound having a hydrolysable residue useful as the binder for the anti-reflecting membrane is not limited to silica sol.

Example 23

An anti-reflecting membrane forming solution was prepared in the same manner as in Example 1, except that 3 parts by weight of the silica sol solution was replaced by 3 parts by weight of a titania sol solution (solids content: 2.5%) and 4 parts by weight of IPA-ST (Nissan Chemical Industries) as a silicon oxide dispersion was replaced by 4 parts by weight of IPA-ST-UP (Nissan Chemical Industries).

Then, an anti-reflecting membrane was formed on a glass plate in the same manner as in Example 1 (1) and (3) to (5), except that the anti-reflecting membrane forming solution was replaced by the above solution. The membrane was evaluated in the same manner as in Example 1 (6). It had a thickness of 80 nm and refractive index of 1.263. It had a reflectance of 0.5% at a wavelength of 555 nm. Pores of 7 to 170 nm in size were found in the cross-section of the membrane by a TEM, as shown in FIG. 2.

The membrane had a surface resistance of $2\times10^{10}\Omega$ at 20° C. and a relative humidity of 50%.

It is thus demonstrated also in Example 23 that a titanium compound is useful, as well as a silicon compound, as the binder for the anti-reflecting membrane.

Example 24

An anti-reflecting membrane forming solution was prepared in the same manner as in Example 1, except that 4 parts by weight of IPA-ST (Nissan Chemical Industries) as a silicon oxide dispersion was replaced by 4 parts by weight of an aluminum oxide dispersion (Nissan Chemical Industries, Aluminasol-520, solids content: 20%).

Then, an anti-reflecting membrane was formed on a glass plate in the same manner as in Example 1 (1) and (3) to (5), except that the anti-reflecting membrane forming solution was replaced by the above solution. The membrane was evaluated in the same manner as in Example 1 (6). It had a thickness of 102 nm and refractive index of 1.315. It had a reflectance of 2.8% at a wavelength of 555 nm. Pores of 5 to 150 nm in size were found in the cross-section of the membrane by a TEM, as shown in FIG. 2.

The membrane had a surface resistance of $2\times10^{10}\Omega$ at 20° C. and a relative humidity of 50%.

It is thus demonstrated in Example 24 that the fine inorganic oxide useful for the anti-reflecting membrane is not limited to silicon oxide.

Example 25

An anti-reflecting membrane forming solution was prepared in the same manner as in Example 1, except that 3 parts by weight of the silica sol solution was replaced by 0.15 parts by weight of acryl resin emulsion (Hitachi Chemical, HITAROIDE, SW6011, solids content: 50%), 4 parts by weight of IPA-ST (Nissan Chemical Industries) as a silicon oxide dispersion was replaced by 4 parts by weight of Snowtex C (Nissan Chemical Industries, solids content: 20%) and 60 parts by weight of ethanol was replaced by 60 parts by weight of water. It had a boiling point of 100° C.

Then, an anti-reflecting membrane was formed on a glass plate in the same manner as in Example 1 (1) and (3) to (5), except that the anti-reflecting membrane forming solution was replaced by the above solution and heating temperature was changed to 120° C. The membrane was evaluated in the same manner as in Example 1 (6). It had a thickness of 90 nm and refractive index of 1.320. It had a reflectance of 2.9% at a wavelength of 555 nm. Pores of 5 to 80 nm in size were found in the cross-section of the membrane by a TEM, as shown in FIG. 2.

The membrane had a surface resistance of $8\times10^{10}\Omega$ at 20° C. and a relative humidity of 50%.

It is thus demonstrated in Example 25 that an organic high-molecular-weight material, e.g., acryl resin, is also useful as the binder for the anti-reflecting membrane forming solution as well as inorganic high-molecular-weight material, e.g., silicon and titanium compounds.

Example 26

An anti-reflecting membrane forming solution was prepared in the same manner as in Example 1, except that 4 parts by weight of IPA-ST (Nissan Chemical Industries) as a silicon oxide dispersion was replaced by 2 parts by weight of IPA-ST-UP (Nissan Chemical Industries) and 2 parts by weight of IPA-ST-ZL (Nissan Chemical Industries).

Then, an anti-reflecting membrane was formed on a glass plate in the same manner as in Example 1 (1) and (3) to (5), except that the anti-reflecting membrane forming solution was replaced by the above solution. The membrane was evaluated in the same manner as in Example 1 (6). It had a thickness of 102 nm and refractive index of 1.250. It had a reflectance of 0.9% at a wavelength of 555 nm. Pores of 5 to 150 nm in size were found in the cross-section of the membrane by a TEM, as shown in FIG. 2.

The membrane had a surface resistance of $4\times10^{10}\Omega$ at 20° C. and a relative humidity of 50%.

It is thus demonstrated in Example 26 that the fine inorganic oxide particles of different shape or size are also useful for the anti-reflecting membrane.

Example 27

An anti-reflecting membrane forming solution was prepared by the following procedure in Example 27. Example 28, and Comparative Examples 1 and 2 also prepared an anti-reflecting membrane forming solution in a similar manner. Characteristics of these membranes were evaluated.

(Preparation of Anti-Reflecting Membrane Forming Solution)

An anti-reflecting membrane forming solution was prepared by mixing 4 parts by weight of a silica sol solution (COLCOAT Co., COLCOAT N-103X) as a binder and 8 parts by weight of a silicon oxide dispersion for fine inorganic oxide particles (IPA-ST-UP, Nissan Chemical Industries, containing solids at 15% by weight) with 40 parts by weight of butanol (Coating Solution A). Similarly, Coating Solution B was prepared by mixing 4 parts by weight of a silica sol solution (COLCOAT Co., COLCOAT N-103X) as a binder and 2 parts by weight of a silicon oxide dispersion for fine inorganic oxide particles (IPA-ST, Nissan Chemical Industries, containing solids at 30% by weight) with 100 parts by weight of butanol. (Pre-treatment of plate before it is coated with a solution for forming the anti-reflecting membrane) A glass plate (100 by 100 by 1.1 mm in size, refractive index: 1.50) was irradiated with ultraviolet ray, 10 mW in intensity, emitted from a low-voltage mercury lamp for 5 minutes. This decreased contact angle of the plate surface with water from 30 to 350 to 100 or less.

(Preparation of Anti-Reflecting Membrane)

Coating Solution A was spread on the pre-treated glass plate by spin coating at 350 rpm for first 5 seconds and then at 1200 rpm for 20 seconds. The coated plate was heated at 160° C. for 10 minutes to thermally set the silica sol. It was then left at room temperature, and was further coated with Solution B on the already formed membrane by spin coating under the same conditions, after it was cooled to 30° C. It was then heated again at 160° C. for 10 minutes, to form the anti-reflecting membrane on the glass plate.

(Evaluation Test Results)

Optical characteristics, physical properties and shape of the membrane prepared above were measured for the following items; membrane thickness, refractive index, minimum reflectance, total light transmittance, pencil hardness, surface resistance, surface roughness and wear resistance. The analytical procedures are described below. The measurement and evaluation results are given in Table 9.

The membrane had a thickness of 100 nm and refractive index of 1.243, determined by an ellipsometer (Mizoziri Kogaku Kogyo, DHA-OLK).

It had a minimum reflectance of 0.3% or less at a wavelength of 500 nm in the visible region (380 to 780 nm), determined by a spectrophotometer (JASCO, V-570 UV/VIS/NIR Spectrophotometer), versus around 9% of the uncoated plate, confirming that the membrane exhibited the anti-reflecting capacity.

Total light transmittance was also measured by the same analyzer for the glass plate coated with the anti-reflecting membrane on both sides. It had a total light transmittance of 98% versus 91% of the uncoated plate, confirming that the membrane improved total light transmittance of the uncoated glass plate.

The membrane had a pencil hardness of 6H, determined in accordance with JIS K-5400.

Wear resistance was evaluated by the following wear resistance test using a surface analyzer (Shinto Scientific, HEIDON-14D). A sliding test piece was moved reciprocally on the anti-reflecting membrane under a certain load to observe presence or absence of scratch mark and its extent, if any. The sliding test piece, 10 by 9.5 by 6 mm in size, was made of aluminum, on which a cotton cloth (Oriex, triangular bandage) was wound quadruply. It was moved reciprocally 10 times for a distance of 45 mm at a speed of 100 mm/second under a load of 1000 g. The tested membrane was visually observed for damages, e.g., scarring or exfoliation, left on the surface. No damage was observed on the surface.

The membrane had a surface resistance of $10^{10}\Omega$ at 26° C. and a relative humidity of 70%, determined by a resistivity tester (Yokogawa Electric, HI-RESISTANCE TESTER MODEL-TR-3).

The membrane had an arithmetic average surface roughness Ra of 3 nm, determined by an atomic force microscope (Seiko Instruments, SPI13700).

Example 28

Preparation of Anti-Reflecting Membrane Forming Solution

An anti-reflecting membrane forming solution was prepared by mixing the same quantity of Coating Solutions A and B (Coating Solution C).

(Pre-Treatment of Plate Before it is Coated with a Solution for Forming the Anti-Reflecting Membrane)

A glass plate was pre-treated in the same manner as in Example 27.

(Preparation of Anti-Reflecting Membrane)

Coating Solution C was spread on the pre-treated glass plate by spin coating at 350 rpm for first 5 seconds and then at 1200 rpm for 20 seconds. The coated plate was heated at 160° C. for 10 minutes to thermally set the silica sol. This produced the anti-reflecting membrane on the glass plate.

(Evaluation Test Results)

The membrane had a refractive index of 1.243, thickness of 100 nm, minimum reflectance of 0.3% or less, total light transmittance of 98%, pencil hardness of 6H, surface resistance of $10^{10}\Omega$ and surface roughness of 3 nm. No damage was observed on the surface.

Comparative Example 1

Preparation of Anti-Reflecting Membrane Forming Solution

Coating Solution C prepared in Example 27 was used.
(Pre-Treatment of Plate Before it is Coated with a Solution for Forming the Anti-Reflecting Membrane)

A glass plate was pre-treated in the same manner as in Example 27.

(Preparation of Anti-Reflecting Membrane)

An anti-reflecting membrane was formed in the same manner as in Example 28, except that Coating Solution C was replaced by Coating Solution A.

(Evaluation Test Results)

The membrane had a refractive index of 1.226, thickness of 100 nm, minimum reflectance of 0.3% or less, total light transmittance of 99%, surface resistance of $10^{10}\Omega$ and surface roughness of 6 nm. However, it had a pencil hardness of 3H, and essentially no membrane remained after the wear resistance test.

Comparative Example 2

(Preparation of Anti-Reflecting Membrane Forming Solution)

An anti-reflecting membrane forming solution was prepared by mixing 4 parts by weight of a silica sol solution (COLCOAT Co., COLCOAT N-103X) as a binder and 3 parts by weight of a silicon oxide dispersion for fine inorganic oxide particles (IPA-ST, Nissan Chemical Industries, containing solids at 30% by weight) with 26 parts by weight of butanol (Coating Solution D).

(Pre-Treatment of Plate Before it is Coated With a Solution for Forming the Anti-Reflecting Membrane)

A glass plate was pre-treated in the same manner as in Example 27.

(Preparation of Anti-Reflecting Membrane)

An anti-reflecting membrane was formed in the same manner as in Example 28, except that Coating Solution C was replaced by Coating Solution D.

(Evaluation Test Results)

The membrane had a refractive index of 1.308, thickness of 100 nm, minimum reflectance of 2.0%, total light transmittance of 95%, pencil hardness of 6H, surface resistance of $10^{10}\Omega$ and surface roughness of 3 nm. No damage was observed on the surface.

The membrane prepared in Comparative Example 1 had a low physical strength, i.e., low pencil hardness and low wear resistance as evidenced by the observation that essentially no membrane remained after the wear resistance test. By contrast, the membrane prepared in Comparative Example 2 had a higher physical strength than that prepared in Comparative Example 1, 6H versus 3H as pencil hardness and showing no damage on the surface. It also had a lower surface roughness, 3 nm versus 6 nm. While the membrane was subjected to the physical strength tests (resistance to scratching evaluated by pencil hardness and resistance to wear evaluated by the sliding test), a larger proportion of the force was applied to the projections on the surface, leading to physical destruction of the membrane. Contrary, a smaller proportion of the force was applied to the cavities. It is considered that the force applied to the projections increases as magnitude of surface irregularities, i.e., surface roughness, increases, to significantly decrease physical strength of the membrane, and so is vice versa, the force is applied more evenly on the membrane surface of smaller irregularities, i.e., smoother surface, to significantly increase its strength. This will account for the above observation that the membrane of higher surface roughness has a lower physical strength.

The low-refractive-index membrane containing a number of fine pores may be improved physical strength and anti-fouling capacity, when coated with an overcoat layer.

It should be noted, when the overcoat layer is of a fluorine compound having a high resistance, that the membrane surface tends to be charged to allow more dust or the like to deposit thereon.

Example 29

Each of the glass plates coated with the anti-reflecting membrane, prepared in Examples 27 and 28, was treated with a liquid-repellent solution.

(1) Preparation of Liquid-Repellent Solution

First, a 0.5% by weight of Compound 1, dissolved in a solvent (Fluorinate PF-5080, 3M), was prepared as a liquid-repellent solution.

(2) Method for Treatment with a Liquid-Repellent Solution

The coated plate was immersed in each liquid-repellent solution for 15 minutes, taken out from the solution, and then put in a constant-temperature bath kept at 130° C. inside for 15 minutes. It was taken out from the bath, and surface-rinsed with PF-5080 to remove the excess liquid-repellent solution. This completed the treatment with the liquid-repellent solution.

(3) Evaluation of Liquid Repellency

The treated plate was evaluated for liquid repellency of the surface by contact angle with water. The results are given in Table 10.

TABLE 9

| | Refractive index | Membrane thickness (nm) | Minimum reflectance (%) | Total light transmittance (%) | Pencil hardness | Wear resistance test results | Surface resistance ($\Omega$) | Surface roughness Ra (nm) |
|---|---|---|---|---|---|---|---|---|
| Glass plate | — | — | 9.0 | 91 | >6H | ◎ | $10^{12}$ | — |
| Example 1 | 1.243 | 100 | <0.3 | 98 | 6H | ◎ | $10^{10}$ | 3 |
| Example 2 | 1.243 | 100 | <0.3 | 98 | 6H | ◎ | $10^{10}$ | 3 |
| Comparative Example 1 | 1.226 | 100 | <0.3 | 99 | 3H | X | $10^{10}$ | 6 |
| Comparative Example 2 | 1.308 | 100 | 2.0 | 95 | 6H | ◎ | $10^{10}$ | 3 |

*Wear resistance test results:
(◎) No damage is observed,
(X) Essentially no membrane remaining To summarize the characteristics related to anti-reflecting capacity and those related to physical strength:
Example 27: the membrane had a minimum reflectance of 0.3% or less and high physical strength.
Example 28: the membrane had a minimum reflectance of 0.3% or less and high physical strength
Comparative Example 1: the membrane had a minimum reflectance of 0.3% or less, but low physical strength, or low resistance to scratching and sliding, as evidenced by the pencil hardness and wear resistance test results.
Comparative Example 2: the membrane had a minimum reflectance of 2.0%, although inferior to that of the membrane prepared in Example 27 or 28, but had a high physical strength.

It is thus demonstrated by these results that an anti-reflecting membrane of high anti-reflecting capacity and physical strength can be realized by providing adequate pores inside and decreasing surface roughness Ra.

It is also found that the membrane of the present invention has a lower electrical resistance than a glass plate to bring an advantage of preventing deposition of dust or the like thereon, because it is charged to a lesser extent.

TABLE 10

| | Contact angle (°) | |
|---|---|---|
| | Before treatment for liquid repellency | After treatment for liquid repellency |
| Example 1 | <10 | 110 |
| Example 2 | <10 | 110 |

Treatment of the membrane surface with the liquid-repellent solution increased its contact angle with water. It is thus demonstrated that the treatment decreases surface energy of the anti-reflecting membrane of the present invention to enhance its anti-fouling capacity.

Example 30

Figure 11:
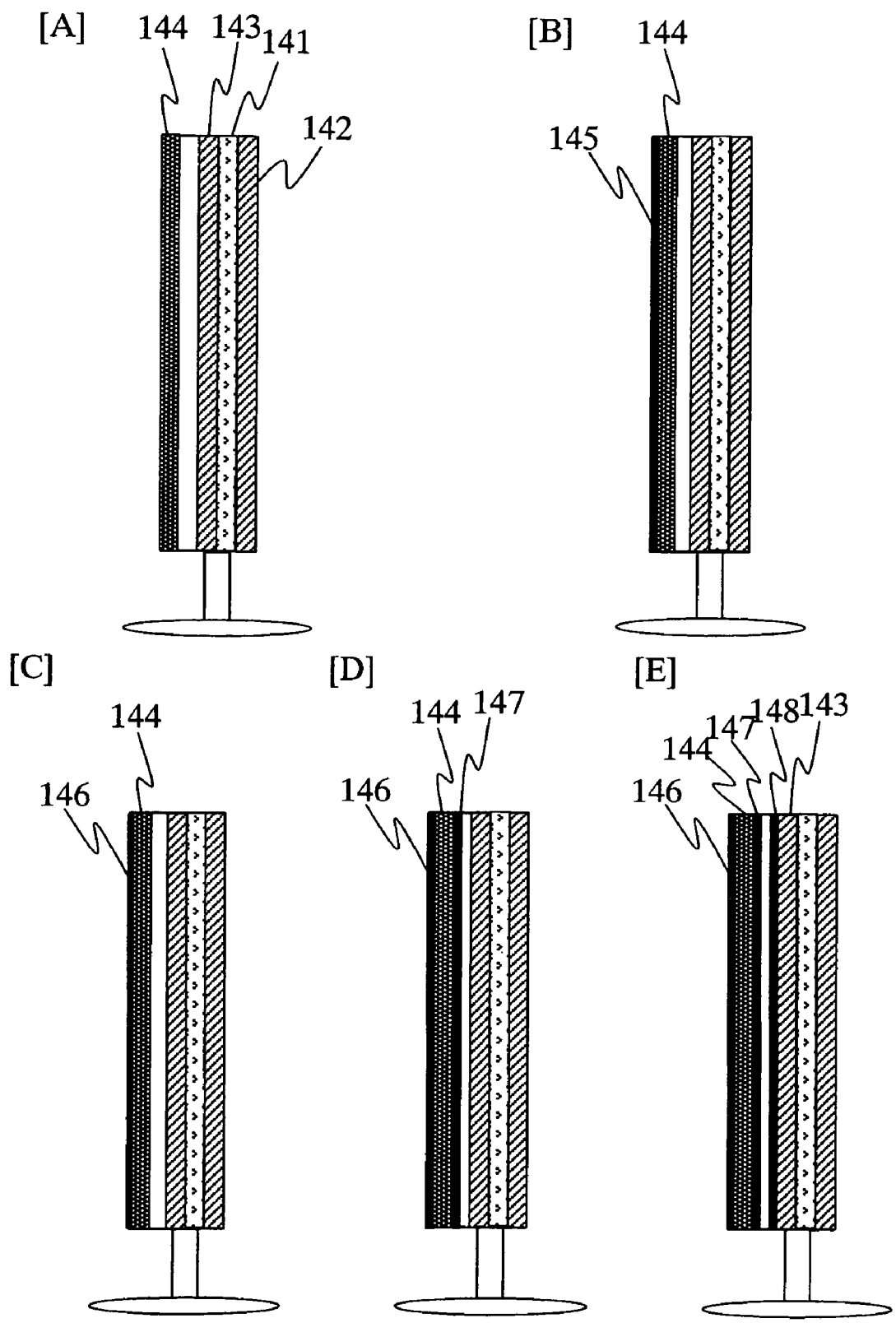
FIG. 11 outlines a side view of the plasma display of the present invention.

The specific embodiments of the anti-reflecting membrane prepared in each of Examples 30, 31 and 32 are described by referring to FIG. 11 [A] to [E].

FIG. 11 [A] shows a plasma display comprising the fluorescent member 141 placed between the back-side glass plate 142 and front-side glass plate 143, and the front filter 144 on the plate 143 via an air layer.

FIG. 11 [B] shows a plasma display comprising the anti-reflecting membrane 145 of a fluorine compound (Asahi Glass, ARCTOP) on the outermost surface, i.e., outside of the front filter 144.

FIG. 11 [C] shows a plasma display comprising the anti-reflecting membrane 146 on the outermost surface, i.e., outside of the front filter 144, where the anti-reflecting membrane was prepared in the same manner as in Example 27, except that it was formed on a different plate.

These displays were set by a window in such a way that sunlight hit them to the same extent. It was observed that reflected light was stronger in a descending order of the plasma displays [A], [B] and [C]. The display [C], in particular, controlled reflection at the front filter to an extent that reflection of ambient objects in the display screen was essentially unnoticeable. These displays [A] and [B] had a visual reflectance, product of reflectance and luminosity factor as a measure of men's visual sensitivity, of 5.3 and 2.1%. On the other hand, the display [C] had a level decreased to 1.3. It is thus demonstrated that the plasma display provided with the anti-reflecting membrane of the present invention (FIG. 11 [C]) has a visible reflectance much lower than that of the conventional display (FIG. 11 [B]).

Example 31

FIG. 11 [D] shows a plasma display of the same model as that of Example 30, except that it was provided with two anti-reflecting membranes 146 and 147 on both sides of the front filter 144 (plasma display [D]), where the membrane was prepared in the same manner as in Example 27, except that it was formed on a different plate.

The plasma displays [C] and [D] were set by a window in such a way that sunlight hit them to the same extent. The plasma display [D] had a visual reflectance decreased to 0.72% from 1.3% of the plasma display [C].

Example 32

FIG. 11 [E] shows a plasma display of the same model as that of Example 30, except that the front filter 144 was provided with the anti-reflecting membranes 146 and 147 on both sides, and front-side glass plate 143 provided with the anti-reflecting membrane 148 on one side (plasma display [E]), where the membrane was prepared in the same manner as in Example 27, except that it was formed on a different plate.

The plasma displays [D] and [E] were set by a window in such a way that sunlight hit them to the same extent. The plasma display [E] had a visual reflectance decreased to 0.078% from 0.72% of the plasma display [C].

Moreover, the plasma display [E] decreased reflection of light emitted from the fluorescent member, by virtue of the additionally provided anti-reflecting membrane on the front glass plate, leading to enhanced output efficiency of the member to produce brighter images.

Example 33

Figure 12:
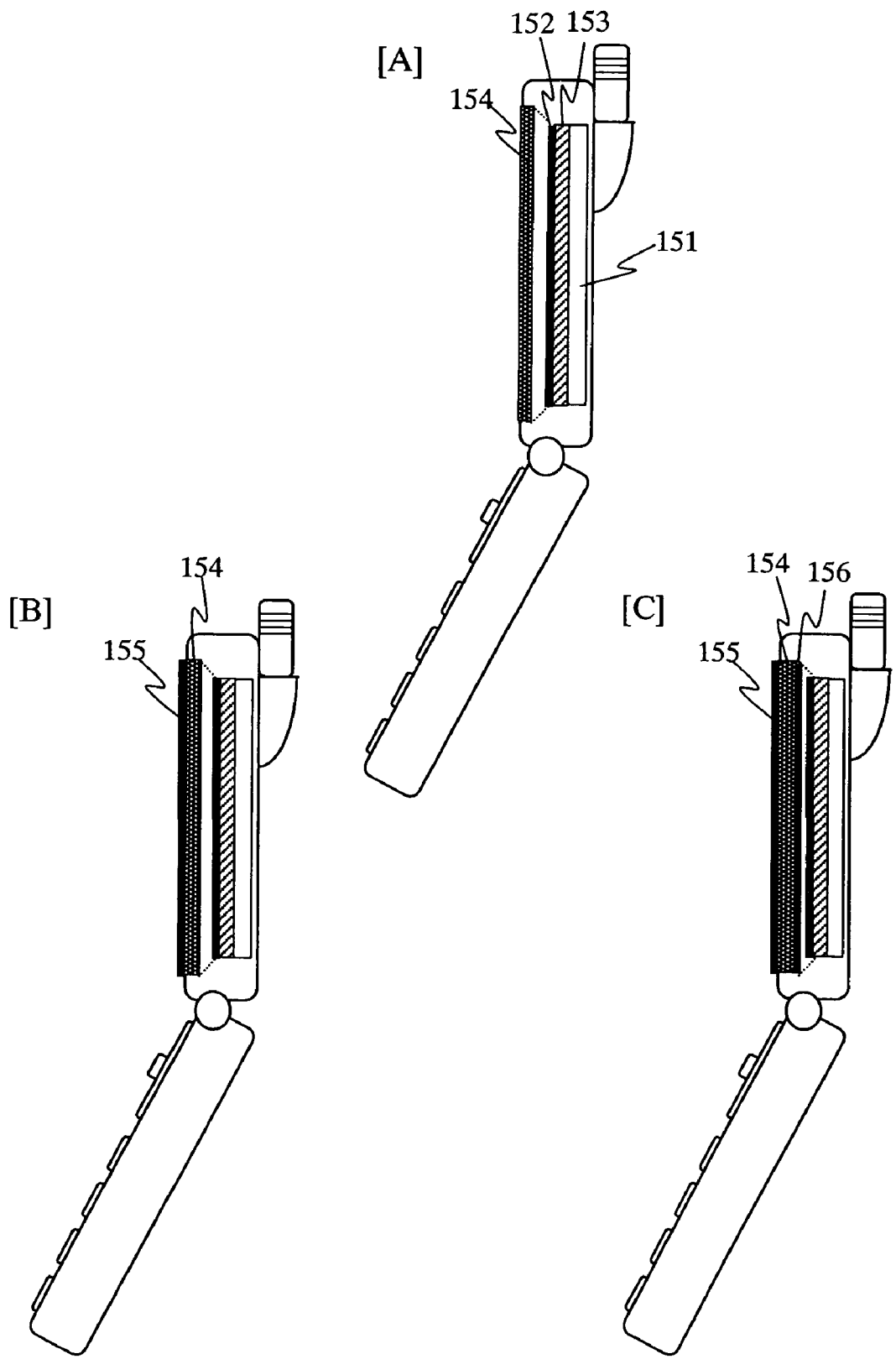
FIG. 12 outlines a side view of the cellular phone of the present invention.

The specific embodiments of the anti-reflecting membrane prepared in each of Examples 33 and 34 are described by referring to FIG. 12 [A] to [C].

FIG. 12 [A] shows a cellular phone comprising the panel 151 composed of a back light unit, back-side polarizing plate, liquid-crystal layer and color filter; and anti-reflecting membrane 152 of a fluorine compound (Asahi Glass, ARCTOP) formed on the front-side polarizing plate 153.

FIG. 12 [B] shows a cellular phone provided with the anti-reflecting membrane 155 on the outermost surface, i.e., outside of the front-side plate 154, where the anti-reflecting membrane was prepared in the same manner as in Example 27, except that it was formed on a different plate.

These phones were set in the outdoors in such a way that sunlight hit them to the same extent. It was observed that the cellular phone [A], which was provided with no anti-reflecting membrane on the outside of the front-side plate, was hard to watch the images, because of significant reflection of ambient objects in the display screen. On the other hand, the cellular phone [B] provided with the anti-reflecting membrane on the outside of the front-side plate controlled reflection at the plate to an extent that reflection of ambient objects in the display screen was essentially unnoticeable, and the images could be watched easily.

Example 34

FIG. 12 [C] shows a cellular phone of the same model as that of Example 33, except that it was provided with two anti-reflecting membranes 155 and 156 on both sides of the front-side plate 154, where the membrane was prepared in the same manner as in Example 27, except that it was formed on a different plate.

These phones cellular phones [A], [B] and [C] were set in the outdoors in such a way that sunlight hit them to the same extent. It was observed that reflected light was stronger in a descending order of the cellular phones [A], [B] and [C]. In other words, the phone provided with the anti-reflecting membrane (cellular phone [C]) controlled reflection of ambient objects in the display screen more efficiently than the other two phones, allowing the images to be watched easily. The anti-reflecting effect was still improved by replacing the anti-reflecting membrane on the polarizing plate by the one prepared in Example 27.

Example 35

Figure 13:
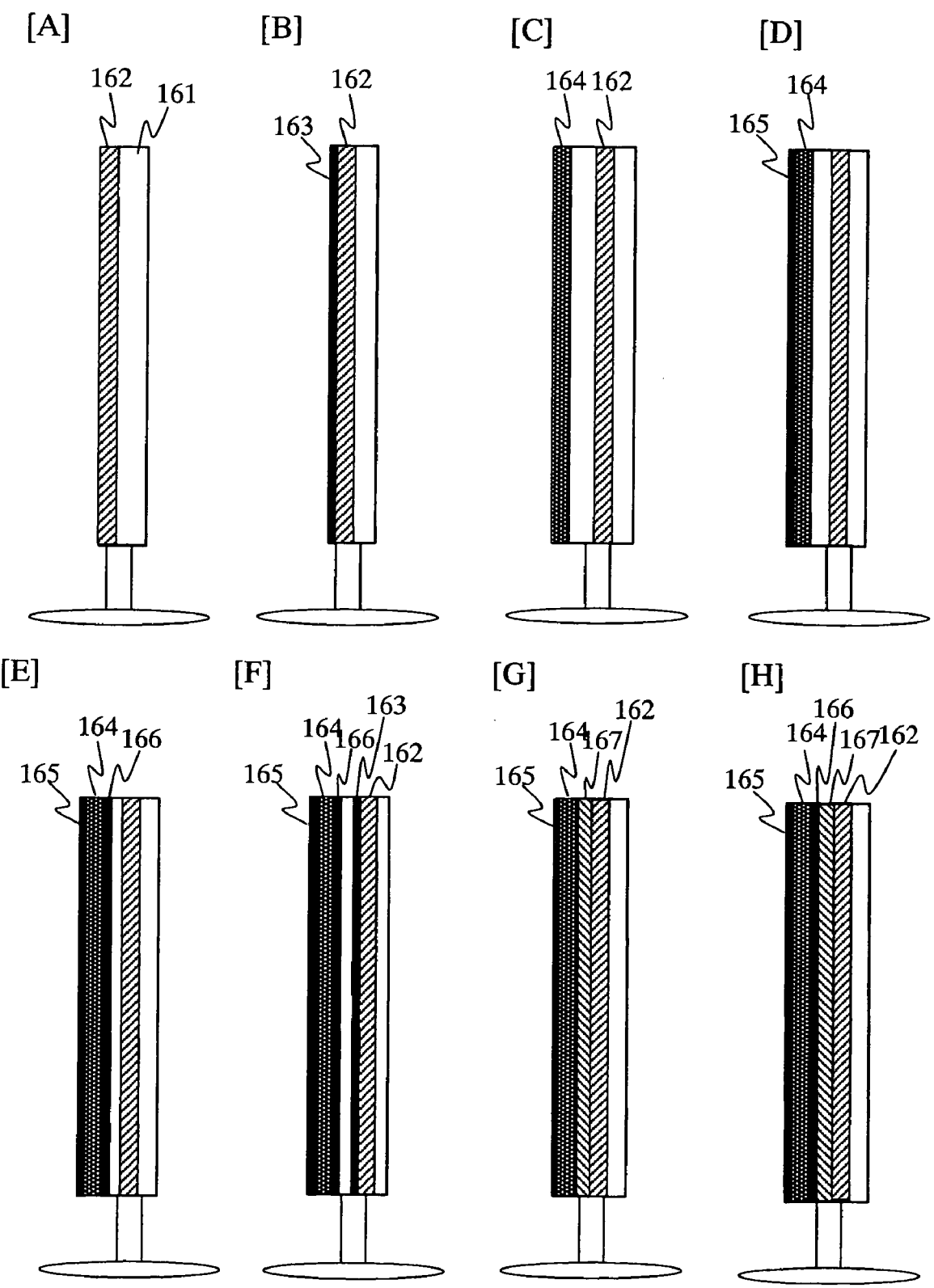
FIG. 13 outlines a side view of one embodiment of the liquid-crystal display of the present invention.

The specific embodiments of the anti-reflecting membrane prepared in each of Examples 35 to 41 are described by referring to FIG. 13 [A] to [H]. These phones used a liquid-crystal display of the same model.

FIG. 13 [A] shows a liquid-crystal display comprising the panel 161 composed of a back light unit, back-side polarizing plate, liquid-crystal layer and color filter; and polarizing plate 162 which was treated for anti-glaring (surface roughening to control reflection of ambient objects in the display screen).

FIG. 13 [B] shows a liquid-crystal display provided with the anti-reflecting membrane 163 formed on the polarizing plate 162, where the membrane was prepared in the same manner as in Example 27, except that it was formed on a different plate.

These displays [A] and [B] were set by a window in such a way that sunlight hit them to the same extent. It was observed that the display [A] produced images becoming whitely unclear because of light scattering on the screen, when it displayed dark images. On the other hand, the display [B], which was provided with the anti-reflecting membrane, controlled incident external light itself by interference to produce clearer images.

Example 36

FIG. 13 [C] shows a liquid-crystal display provided with the acryl resin plate 164 on the front surface of the polarizing plate 162 via an air layer.

The display [A] provided with no acryl resin plate and display [C] provided with the acryl resin plate 164 were tested by the following procedure for impact resistance of the display screen.

First, these displays were set on the floor with the display screen facing the ceiling, on which an iron ball (diameter: 50 mm) was dropped from a height of 1 m. Then, each display was switched on to display images. The display [A] provided with no acryl resin plate could not normally display images, because the iron ball hit the polarizing plate on the display screen and broke the glass inside. On the other hand, the display [B] provided with the acryl resin plate normally displayed images. The area hit by the iron ball was damaged slightly, but to an extent not posing a problem for watching images.

Thus, it is found that the acryl resin plate improves impact resistance of a display apparatus which it protects.

Example 37

FIG. 13 [D] shows a liquid-crystal display provided with the anti-reflecting membrane 165 formed on the outer side of the acryl resin plate 164, where the membrane was prepared in the same manner as in Example 27, except that it was formed on a different plate.

The display [C] provided with no anti-reflecting membrane and display [D] were set by a window in such a way that sunlight hit them to the same extent. It was observed that the display [D] controlled reflection at the front filter to an extent that reflection of ambient objects in the display screen was essentially unnoticeable.

Example 38

FIG. 13 [E] shows a liquid-crystal display comprising the acryl resin plate 164 coated with the anti-reflecting membranes 165 and 166 on both sides, where the membrane was prepared in the same manner as in Example 27, except that it was formed on a different plate.

The display [C] provided with no anti-reflecting membrane on the acryl resin plate, display [D] provided with the anti-reflecting membrane on one side of the plate and display [E] provided with the anti-reflecting membranes on both sides of the plate were set by a window in such a way that sunlight hit them to the same extent. It was observed that reflected light was stronger in a descending order of the displays [A], [B] and [C]. In other words, the display provided with the anti-reflecting membranes, prepared in Example 38, controlled reflection of ambient objects in the display screen more efficiently than the other two displays.

Example 39

FIG. 13 [F] shows a liquid-crystal display comprising the acryl resin plate 164 coated with the anti-reflecting membranes 165 and 166 on both sides, and polarizing plate 162 provided with the anti-reflecting membrane 163, where the membrane was prepared in the same manner as in Example 27, except that it was formed on a different plate.

The display [C] provided with no anti-reflecting membrane on the acryl resin plate and display [E] were set by a window in such a way that sunlight hit them to the same extent. It was observed that the display [F] controlled reflection at the front filter to an extent that reflection of ambient objects in the display screen was essentially unnoticeable by virtue of the anti-reflecting membranes. Moreover, it produced clearer images, because of controlled light scattering on the polarizing plate.

Example 40

FIG. 13 [G] shows a liquid-crystal display comprising the acryl resin plate 164 coated with the anti-reflecting membrane 165 in the same manner as in Example 27, except that it was formed on a different plate; polarizing plate 162 bonded to the plate 164 at the edges by a two-sided tape; and organic layer 167 having a refractive index 1.5 placed between the polarizing plate 162 and acryl resin plate 164 to control scattering of light on the plate 162 surface, which would otherwise occur as a result of the anti-glaring treatment of the surface. Immersion oil (Nikon, Immersion Oil A MXA20234) was used for the organic layer.

The display [G] produced clearer images than display [C], provided with no anti-reflecting membrane on the acryl resin plate, because of light reflection occurring to a negligible extent in the interfaces between the polarizing plate and air and between the acryl resin plate and air, and also because of substantially eliminated scattering of light resulting from the anti-glaring treatment.

Moreover, a polarizing plate treated for anti-glaring or provided with an anti-reflecting membrane can be dispensed with, because of a negligible effect of the interface between the polarizing plate and air.

Example 41

FIG. 13 [H] shows a liquid-crystal display comprising the acryl resin plate 164 coated with the anti-reflecting membranes 165 and 166 in the same manner as in Example 27, except that each was formed on a different plate. The membrane was formed by dip coating, which generally loses a coating solution less than spin coating. The polarizing plate 162 was bonded to the acryl resin plate 164 at the edges by a two-sided tape, and the organic layer 167 having a refractive index 1.3 was placed between the polarizing plate 162 and acryl resin plate 164 to control scattering of light on the plate 162 surface, which would otherwise occur as a result of the anti-glaring treatment of the surface. The polarizing plate and anti-reflecting membrane on the acryl resin plate had a refractive index of 1.5 and 1.2, respectively. Use of an organic layer having a refractive index of around 1.3 would decrease reflection in the interfaces between the polarizing plate and organic layer and between the acryl resin plate and organic layer to a negligible level of around 0.1%. A fluorine oil (DuPont, Krytox 143AC) was used for the organic layer. The liquid-crystal display [H] produced clearer images than display [C], provided with no anti-reflecting membrane on the acryl resin plate, because of light reflection occurring to a negligible extent in the interfaces between the polarizing plate and air and between the acryl resin plate and air, and also because of substantially eliminated scattering of light resulting from the anti-glaring treatment.

Moreover, a polarizing plate treated for anti-glaring or provided with an anti-reflecting membrane can be dispensed with, because of a negligible effect of the interface between the polarizing plate and air.

Still more, the anti-reflecting membrane prepared in Example 41 could be formed by dip coating to lose less coating solution.

Example 42

Example 42 used a liquid-crystal display having the same structure as the display [C], except that it was provided with a light-emitting diode (LED) as a back light. An LED has characteristics of saving more energy than a cold-cathode type fluorescent lamp (CCFL) commonly used as a liquid-crystal back light, low running cost, long service life and needing no mercury, which is a hazardous material. One of the problems involved in an LED comes from its high light-emitting efficiency. It releases only a limited quantity of heat to little increase temperature of the liquid-crystal display around. As a result, the display may have an insufficient speed of response, when working at a low room air temperature. For example, a liquid-crystal display using a cold-cathode fluorescent lamp has a surface temperature increased to 40° C., whereas it is 30° C. when an LED is used. This may disturb display of motion pictures, resulting from insufficient response speed of the liquid-crystal layer. In Example 42, the liquid-crystal display was covered with the acryl resin plate 164 on the front side for insulation. The acryl resin plate 164 was coated with the anti-reflecting membranes 165 and 166 in the same manner as in Example 27, and so was the polarizing plate 162 coated with the anti-reflecting membrane 163. This structure was the same as that for the liquid-crystal display [C].

The liquid-crystal display provided with the LED back light was visually compared with the liquid-crystal display [C] in displayed motion picture conditions. It was comparable to the liquid-crystal display [C] in surface temperature (40° C.) and displayed motion picture conditions. An organic resin, e.g., acryl resin, is less thermoconductive than glass, and more insulating. Therefore, it is judged that the liquid-crystal display is efficiently insulated with the acryl resin plate to have a response speed comparable to that of the liquid-crystal display [C]. Moreover, the anti-reflecting membrane in the liquid-crystal display provided with the LED back light controlled light reflection, decreasing reflection of ambient objects in the display screen to an essentially unnoticeable extent.

Example 43

Figure 14:
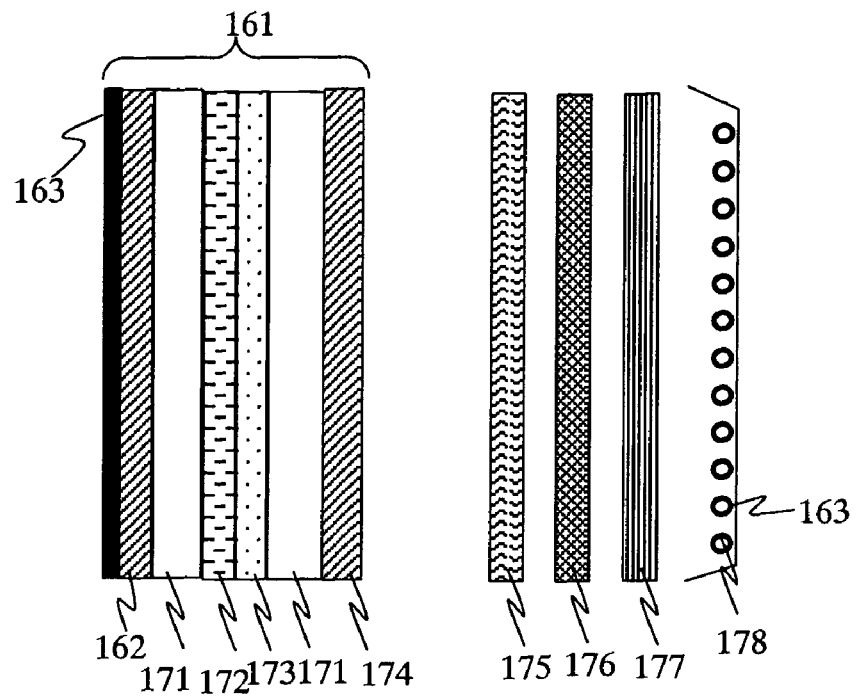
FIG. 14 outlines a side view of another embodiment of the liquid-crystal display of the present invention.

The two liquid-crystal displays prepared in Example 35 and shown in FIG. 13 [B] were tested in Example 43. FIG. 14 illustrates its internal structure. The panel 161 shown in FIG. 13 [B] was composed of the light-emitting side polarizing plate 162, glass plate 171, color filter 172, liquid-crystal layer 173 and incident light side polarizing plate 174, where the polarizing plate 162 was coated with the anti-reflecting membrane 163. The back light unit was composed of the diffusion sheet 175, prism sheet 176, diffusion plate 177 and cold-cathode fluorescent lamp 178.

The cold-cathode fluorescent lamp 178 as the light source in one of these displays was coated with the anti-reflecting membrane 163 on the glass surface in the same manner as in Example 27, except that it was formed on a plate of different shape by dip coating using a coating solution of different composition. This is also illustrated in FIG. 14.

These displays were set in a dark room, to compare the images they produced. It was observed that the display shown in FIG. 14, having the cold-cathode fluorescent lamp 178 coated with the anti-reflecting membrane on the glass surface produced brighter images than the one shown in FIG. 13, even when these images were the same. The display shown in FIG. 14 produced images of 1% higher brightness, as confirmed by a spectroradiometric brightness photometer (PHOTORE-SEARCH, PR705), conceivably resulting from increased transmittance at the cold-cathode fluorescent lamp tube surface.

The results indicate that an optical lens can have improved transmittance when coated with the anti-reflecting membrane, even when an LED is used. It is thus demonstrated that a display apparatus can produce brighter images, when its light source is coated with the anti-reflecting membrane of the present invention.

Example 44

Figure 15:
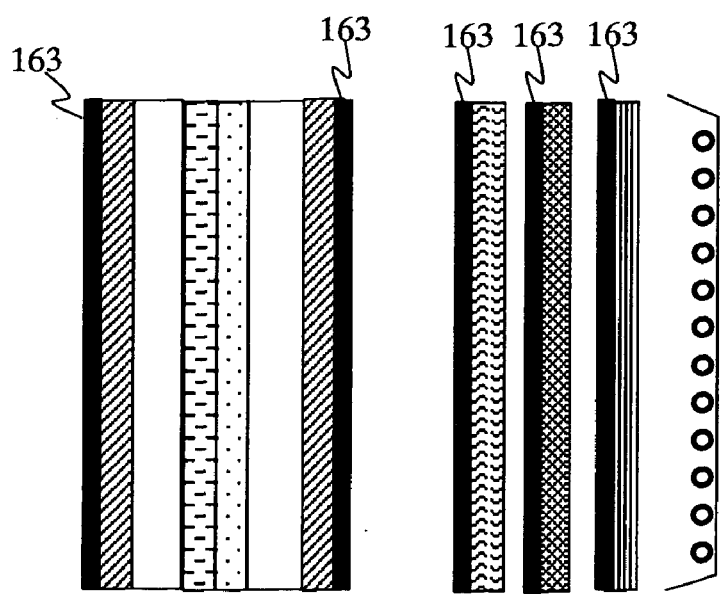
FIG. 15 outlines a side view of still another embodiment of the liquid-crystal display of the present invention.

Another liquid-crystal display of the same model as that prepared in Example 43 was tested. Each of the diffusion plate, diffusion sheet, prism sheet and light-emitting side polarizing plate constituting the back light unit was coated with the anti-reflecting membrane 163 in the same manner as in Example 27. FIG. 15 illustrates the structure.

The display shown in FIG. 14 and the one shown in FIG. 15 were set in a dark room, to compare the images they produced. It was observed that the display shown in FIG. 15 produced brighter images than the one shown in FIG. 14, even when these images were the same. The display shown in FIG. 15 produced images of 5% higher brightness, as confirmed by a spectroradiometric brightness photometer (PHOTORE-SEARCH, PR705), conceivably resulting from increased transmittance at each member in the back light unit. It is thus demonstrated that a display apparatus can produce brighter images, when its member is coated with the anti-reflecting membrane of the present invention.

It should be further understood by those skilled in the art that although the foregoing description has been made on embodiments of the invention, the invention is not limited thereto and various changes and modifications may be made without departing from the spirit of the invention and the scope of the appended claims.

ADVANTAGE OF THE INVENTION

The present invention can form a single-layer anti-reflecting membrane having a very low refractive index and high anti-reflecting capacity by a simple procedure of spreading and thermally setting a coating solution. Optical devices and members, e.g., display apparatuses and DVD disks, can reproduce records at a high sensitivity while controlling reflection of ambient objects in the display screen, when provided with the anti-reflecting membrane. It is found that the anti-reflecting membrane can bring effects of controlling reflection of ambient objects in the display screen and enhancing impact resistance for a liquid-crystal display, which is low in impact resistance because a polarizing plate works as the display screen, when the outermost surface is covered with a transparent plate (of acryl resin, glass or the like) coated with the anti-reflecting membrane.

It is also found that the anti-reflecting membrane can efficiently utilize sunlight, because of greatly controlled reflection, and is applicable to solar energy converting devices and greenhouses comprising a member coated therewith to accelerate growth of plants.

It is also found that the anti-reflecting membrane is applicable to building interior materials, because it is sufficiently low in electrical resistance to give a highly anti-fouling plate.

The invention claimed is:

1. An anti-reflecting membrane, formed on at least one side of a plate which transmits visible light, comprising fine inorganic oxide particles and a binder, and having a thickness of 60 to 190 nm and pores of 5 to 200 nm in size inside, wherein an arithmetic average surface roughness (Ra) is about 3 nm on a side of the membrane that is not in contact with the plate, the binder and plate are composed of a same material, the pores are distributed more densely inside the membrane than on a surface of the membrane that is in contact with air, and the pores are distributed more densely in a vicinity of the surface of the membrane that is in contact with air than at the surface of the membrane that is in contact with the plate.

2. The anti-reflecting membrane on a plate according to claim 1, wherein the fine inorganic oxide particles are of silicon oxide.

3. The anti-reflecting membrane on a plate according to claim 2, wherein the silicon oxide has a chain-shaped structure.

4. The anti-reflecting membrane on a plate according to claim 1, wherein the fine inorganic oxide particles are of silicon oxide and the binder is of a silicon compound having a hydrolysable residue.

5. The anti-reflecting membrane on a plate according to claim 1 which has a surface resistance of $10^{11}\Omega$ or less.

6. The anti-reflecting membrane on a plate according to claim 1, further comprising a surface layer composed of a fluorine compound formed on a surface of the anti-reflecting membrane, the layer having a contact angle of 100 to 180°, inclusive, with water.

7. The anti-reflecting membrane on a plate according to claim 6, wherein the fluorine compound is chemically bound to the anti-reflecting membrane and has one of the following formulae

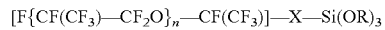

n=6 to 48

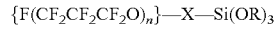

n=6 to 48

  (Formula 1)

n=1 to 16

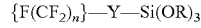

n=1 to 16 wherein, X is a site at which a perfluoropolyether chain and alkoxy silane residue are bound to each other, Y is a site at which a perfluoroalkyl chain and alkoxy silane residue are bound to each other, and R is an alkyl group.

8. The anti-reflecting membrane on a plate according to claim 1, wherein the fine inorganic oxide particles are of silicon oxide, have a chain-shaped structure and account for 75% by weight or more of the solids in the membrane.

9. A display apparatus having an anti-reflecting membrane on a plate according to claim 1, wherein the plate is an outermost surface of a display screen.

10. An optical storage medium working based on differential reflectance of light at a recording section, wherein the anti-reflecting membrane according to claim 1 is provided on an outermost surface of the at least one side of the plate which transmits visible light, the optical storage medium further comprising protective and recording layers in between the plate which transmits visible light and a second plate.

11. A greenhouse having at least one transparent wall, wherein the wall comprises the anti-reflecting membrane on a plate according to claim 1.

12. A mobile display device having an inputting section and display screen, wherein the display screen comprises the anti-reflecting membrane according to claim 1 formed on the plate which transmits visible light.

13. A solar energy converting device comprising an insulating transparent plate, surface electrode, photon-electron converter, middle transparent electrode and bottom electrode, wherein the insulating transparent plate comprises the anti-reflecting membrane on a plate according to claim 1.

14. A transparent plate for building interior materials, wherein the plate is the plate which transmits visible light and which is provided with the anti-reflecting membrane according to claim 1.

15. An anti-reflecting membrane, formed on at least one side of a plate which transmits visible light, comprising fine particles of inorganic oxide and a binder, and having pores inside, wherein the pores are distributed more densely inside than on a surface in contact with air, an arithmetic average surface roughness (Ra) is about 3 nm on a side of the membrane that is not in contact with the plate, and the pores are distributed more densely in a vicinity of the surface of the membrane that is in contact with air than at the surface of the membrane that is in contact with the plate.

16. The anti-reflecting membrane on a plate according to claim 15, wherein the pores have a major axis of 5 to 200 nm, inclusive.

17. The anti-reflecting membrane on a plate according to claim 15, wherein the membrane has a lower refractive index than the plate.

18. The anti-reflecting membrane on a plate according to claim 15, wherein the fine particles have a major axis of 190 nm or less and minor axis shorter than thickness of the membrane.

19. An optical member having the anti-reflecting membrane on a plate according to claim 15.

20. A liquid-crystal display panel comprising the anti-reflecting membrane on a plate according to claim 15, wherein the plate is a polarizing plate and is one of a pair of plates in the panel, the panel further comprising a liquid-crystal layer placed between the pair of plates, and electrodes for applying charges on the liquid-crystal layer.

21. The liquid-crystal display panel according to claim 20, further comprising a transparent plate formed on a side of the polarizing plate opposite the liquid-crystal layer with an air layer between the transparent plate and the polarizing plate, and the anti-reflecting member is disposed between the air layer and the polarizing plate.

22. A display apparatus comprising a light source and the liquid crystal display panel according to claim 21 for controlling light emitted from the light source to display an image, wherein the light source is partly or totally composed of an LED, and the transparent plate is made of an organic resin.

23. The liquid-crystal display panel according to claim 20, further comprising a transparent plate is formed on a side of the polarizing plate opposite the liquid-crystal layer with an organic layer between the transparent plate and the polarizing plate, and the anti-reflecting membrane is disposed between the organic layer and the polarizing plate.

24. A display apparatus comprising a light source and the liquid crystal display panel according to claim 23 for controlling light emitted from the light source to display an image, wherein the light source is partly or totally composed of an LED, and the transparent plate is made of an organic resin.

25. The liquid-crystal display panel according to claim 23, wherein the liquid-crystal display panel further comprises a display panel surface member, wherein the display panel surface member, the transparent plate and the organic layer satisfy the following inequalities:

$$|n_1 - n_0| \leq 0.2 \text{ and } |n_2 - n_0| \leq 0.2$$

wherein, $n_0$: refractive index of the display panel surface member $n_1$: refractive index of the transparent plate $n_2$: refractive index of the organic layer.

26. A display apparatus comprising a light source and the liquid-crystal display panel according to claim 20 for controlling light emitted from the light source to display an image.

27. The display apparatus according to claim 26, wherein the light source is coated with an anti-reflecting membrane.

28. The display apparatus according to claim 26, wherein at least one member having an interface with air is provided between the light source and liquid-crystal display panel, the member being coated with an anti-reflecting membrane.

29. The display apparatus according to claim 28, wherein the member is selected from the group consisting of a diffusion plate, diffusion sheet, film having a prism structure on the surface, optical waveguide, polarizing plate reflecting certain polarized light and polarizing plate absorbing certain polarized light.

30. A display panel comprising the anti-reflecting membrane according to claim 15, formed on at least one side of the plate which transmits visible light, which plate is one of a pair of plates, a fluorescent member placed between the pair of plates, and electrodes on at least one side of one of the plates and in contact with the fluorescent member.

* * * * *